US012616316B2

(12) United States Patent (10) Patent No.: US 12,616,316 B2
Mu (45) Date of Patent: *May 5, 2026

(54) FOLDABLE CONTAINER AND FOLDABLE SUPPORTING FRAME THEREOF, AND FOLDING METHOD

(71) Applicant: TAN GROW INC., Blue Island, IL (US)

(72) Inventor: Mengmeng Mu, Zhejiang (CN)

(73) Assignee: TAN GROW INC., Blue Island, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/251,726

(22) Filed: Jun. 26, 2025

(65) Prior Publication Data

US 2025/0318662 A1 Oct. 16, 2025

Related U.S. Application Data

(63) Continuation of application No. 19/001,515, filed on Dec. 25, 2024, which is a continuation of application
(Continued)

(51) Int. Cl.
*A47D 9/00* (2006.01)
*A47B 3/091* (2006.01)
(Continued)

(52) U.S. Cl.
CPC .............. *A47D 9/005* (2013.01); *A47B 3/091* (2013.01); *A47D 7/002* (2013.01); *A47D 9/008* (2022.08);
(Continued)

(58) Field of Classification Search
CPC . B65D 11/18; B65D 11/1833; B65D 11/1846; B65D 11/1853; B65D 11/184;
(Continued)

(56) References Cited

U.S. PATENT DOCUMENTS

| | | | |
|---|---|---|---|
| 4,146,938 A * | 4/1979 | Shakas | A47K 3/064 5/904 |
| 6,588,033 B1 * | 7/2003 | Welsh, Jr. | A47D 7/002 5/98.1 |

(Continued)

FOREIGN PATENT DOCUMENTS

WO WO-2019233431 A1 * 12/2019 ............. A47K 3/064

OTHER PUBLICATIONS

English Machine Translation of WO-2019233431-A1 (Year: 2019).*
(Continued)

*Primary Examiner* — Laura E. Parker
(74) *Attorney, Agent, or Firm* — Che-Yang Chen

(57) ABSTRACT

A foldable container includes a foldable supporting frame, at least one operation switch arranged on the foldable supporting frame, and a container body supported on the foldable supporting frame. The operation switch is actuated through a pulling operation to move the foldable supporting frame between an unfolded mode and a folded mode. The container has an edge and an opening formed within the edge. At the unfolded mode, the opening is opened. At the folded mode, the opening is closed. The container body is automatically folded as the foldable supporting frame is moved from the unfolded mode to the folded mode. Via a folding method, the foldable supporting frame is folded to reduce an overall size for occupying less storage space when it is not in use.

11 Claims, 24 Drawing Sheets

A-A

Related U.S. Application Data

No. 17/747,857, filed on May 18, 2022, now Pat. No. 12,268,312, which is a continuation-in-part of application No. 17/251,752, filed on Dec. 11, 2020, now Pat. No. 11,623,788, which is a continuation of application No. 16/041,822, filed on Jul. 22, 2018, now Pat. No. 10,882,662.

(51) Int. Cl.

| | |
|---|---|
| *A47D 7/00* | (2006.01) |
| *B65D 5/20* | (2006.01) |
| *B65D 6/18* | (2006.01) |
| *B65D 21/08* | (2006.01) |
| *B65D 25/24* | (2006.01) |
| *D06F 95/00* | (2006.01) |
| *F16M 11/10* | (2006.01) |
| *F16M 11/20* | (2006.01) |
| *F16M 11/38* | (2006.01) |

(52) U.S. Cl.
CPC ............ *B65D 7/26* (2013.01); *B65D 21/086* (2013.01); *B65D 25/24* (2013.01); *F16M 11/10* (2013.01); *F16M 11/20* (2013.01); *F16M 11/38* (2013.01); *B65D 5/20* (2013.01); *D06F 95/002* (2013.01)

(58) Field of Classification Search
CPC .......... B65D 11/186; B65D 7/24; B65D 7/32; B65D 21/08; B65D 21/083; B65D 7/26; B65D 21/086; B65D 25/24; B65D 5/20; A01K 13/001; A47B 3/091; A47D 7/002; F16M 11/10; F16M 11/38; D06F 95/002
USPC .......................................................... 220/6
See application file for complete search history.

(56) References Cited

U.S. PATENT DOCUMENTS

| | | | | |
|---|---|---|---|---|
| 11,627,817 | B1 * | 4/2023 | Flannery ............... | A47D 9/008 |
| | | | | 5/93.1 |
| 12,178,333 | B2 * | 12/2024 | Mu ........................ | A47D 9/008 |
| 12,268,312 | B2 * | 4/2025 | Mu ........................ | A47B 3/091 |
| 2022/0031089 | A1 * | 2/2022 | Zhong ................... | A47D 9/005 |
| 2023/0320495 | A1 * | 10/2023 | Zhu ...................... | A47D 15/003 |
| | | | | 5/112 |

OTHER PUBLICATIONS

Furesh—Elevated Folding Dog Bath Tub, retrieved from https://www.lovefuresh.com/collections/dog-bathtub/products/dog-bath-tub (Year: 2020).*

Furesh, "Furesh Launches One-of-a-Kind, Foldable Dog Bathtub," retrieved from https://www.prnewswire.com/news-releases/furesh-launches-one-of-a-kind-foldable-dog-bathtub-301025008.html, dated Mar. 16, 2020 (Year: 2020).*

* cited by examiner

A-A

FOLDABLE CONTAINER AND FOLDABLE SUPPORTING FRAME THEREOF, AND FOLDING METHOD

CROSS REFERENCE OF RELATED APPLICATION

This is a Continuation application that claims the benefit of priority under 35 U.S.C. § 120 to a non-provisional application, application Ser. No. 19/001,515, filed Dec. 25, 2024, which is a Continuation application that claims the benefit of priority under 35 U.S.C. § 120 to a non-provisional application, application Ser. No. 17/747,857 filed May 18, 2022, which is a Continuation-In-Part application that claims the benefit of priority under 35 U.S.C. § 120 to a non-provisional application, application Ser. No. 17/251,752, filed Dec. 11, 2020, which is a non-provisional application which is a U.S. National Stage under 35 U.S.C. 371 of the International Application Number PCT/CN2019/090087, filed Jun. 5, 2019, which claims priority to Chinese application numbers 201810575375.9, 201820871770.7, 201820871648.X and 201820871354.7, filed Jun. 6, 2018, and also a Continuation application that claims the benefit of priority under 35 U.S.C. § 120 to a non-provisional application, application Ser. No. 16/041,822, filed Jul. 22, 2018, this application is also a non-provisional application that claims priority under 35 U.S.C. § 119 to China application number CN202220709424.5, filed Mar. 29, 2022, which are incorporated herewith by reference in their entirety.

BACKGROUND OF THE PRESENT INVENTION

Field of Invention

The present invention relates to a foldable appliance, and more particularly to a foldable container with foldable supporting frame and folding method thereof.

Description of Related Arts

Many foldable brackets are designed and aid for daily entertainment activities. Accordingly, a height of the bracket can be raised to lift up the appliance from the ground during the use of the appliance. As a result, the user does not have to bend or squat to use the appliance. Once the bracket is folded, a size of the bracket is reduced for storage and space saving.

Household temporary container, especially large size receptacle, is popular to be used as basin, bathtub or swimming pool for bathing, cleaning or playing purpose. This temporary container is convenient for most families. For example, the user is able to move this temporary container from place to place, such as bathroom or yard, as needed. Since this kind of container needs to have space large enough to hold at least a child or pet inside while having enough space to contain water or cleaning liquid, the conventional container is generally made in larger size. This kind of rigid container is convenient for most families also take wider space for using water, usually in outdoor area or bathroom. It is known that such relatively large container is not required to be used all the time or even daily use, this temporary container will not be the primary consideration for most families in view of storage, especially for urban families. Since the storage in urban family is very limited, it is a problem to store the temporary container when it is not in used. These defects of the temporary container cannot be solved and this temporary container is not practical in use.

Specifically, in order to reduce the space occupied by the temporary container when it is not in use, the current temporary container is designed to be inflatable, such that the temporary container is reused by inflating and deflating the temporary container. Usually, the temporary container is inflated by an inflator or inflatable pump. Before using the inflatable temporary container, it is necessary to initially place the inflatable temporary container in a preset position, and then use the inflatable pump to inflate the inflatable temporary container for at least five minutes for fully inflate the temporary container by filling a predetermined amount of gas to bias against the inner sidewall of the temporary container so as to support the shape of the temporary container. In other words, it is very troublesome to setup the temporary container. If the inflatable pump is damaged or lost, the inflatable temporary container cannot be used at all. Moreover, in order to facilitate the temporary container being folded after deflation, it is also necessary to provide an air exhaust vent at the temporary container. If the air exhaust vent is poorly sealed, air leakage is likely to occur. Once the inflatable temporary container has an air leakage problem, it is easy to cause the water or cleaning liquid contained in the temporary container to leak out, especially for the temporary container used in the living room. In other words, if the water or cleaning fluid leaks out of the temporary container, it will inevitably cause water damage to the home environment. Furthermore, during the manufacturing process of the inflatable temporary container, the air exhaust vent is affixed to the sidewall of the temporary container to communicate with an interior air chamber of the inflatable temporary container. It is difficult to ensure the tightness between the sidewall and the air exhaust vent.

For the temporary container made of plastic, it must be stored indoors in order to prevent the plastic aging from directly exposing under the sun. Therefore, it is necessary to save a larger space for storing the temporary container. In some cases, the entire temporary container is used to store various items inside the container during storage, such that these items must be placed somewhere in the storage room. However, before the next use of the temporary container, additional steps are required to take out the items and clean the container before use.

In addition to liquid containers, some cooking utensils, such as grills, table tops, etc., have similar problems. One of the major problems is stability after it is setup. Since the foldable bracket is movable, it is a major concern how to keep the stability of the foldable bracket when it is unfolded. The existing foldable bracket is basically constructed to have a X-shaped pivotal structure. This structure provides high mobility and is easy to deform during use. The foldable angle may increase permanently as the structure is frequently used.

In addition, the temporary container is directly placed on the ground when it is used, wherein the user will need to bend over when helping children or pets to clean, which is likely to hurt health the user, especially the back of the user.

Even though the existing foldable brackets can be folded, the folding operation thereof requires many steps. Basically, it requires two hands to close the bracket, and may also need to rotate and fold different parts of the bracket frame. So, the traditional folding process of the foldable bracket is very troublesome. Since the folding process is complicated and difficult, the user will merely keep the temporary container being unfolded all the time, which fails to achieve the main purpose of folding up the temporary container for storage to save the space.

SUMMARY OF THE PRESENT INVENTION

The invention is advantageous in that it provides a foldable container and a foldable supporting frame thereof and its folding method, wherein the foldable container can be folded to reduce the overall size thereof when the foldable container in not in use.

Another advantage of the invention is to provide a foldable container and a foldable supporting frame thereof and its folding method, wherein the space occupied by the foldable container after being folded is greatly reduced to save the storage space of the foldable container and to allow the folded foldable container to be easily carried.

Another advantage of the invention is to provide a foldable container and a foldable supporting frame thereof and its folding method, wherein when the foldable supporting frame is unfolded, the foldable supporting frame is raised and supported at a predetermined height for stably supporting the container.

Another advantage of the invention is to provide a foldable container and a foldable supporting frame thereof and its folding method, wherein the size of the foldable supporting frame is enlarged when it is unfolded and the size of the foldable supporting frame is reduced when it is folded.

Another advantage of the invention is to provide a foldable container and a foldable supporting frame thereof and its folding method, wherein the foldable container can be conveniently operated to quickly convert the foldable container between the folded mode and the unfolded mode. The folding and unfolding operations of the foldable container does not require any tool to move foldable container between the folded mode and the unfolded mode.

Another advantage of the invention is to provide a foldable container and a foldable supporting frame thereof and its folding method, wherein the foldable supporting frame is folded by a single pulling force without additional force or steps, and then the foldable supporting frame is folded up and is ready for storage or carry.

Another advantage of the invention is to provide a foldable container and a foldable supporting frame thereof and its folding method, wherein the foldable supporting frame is easily pulled for being folded up and stored. Therefore, the folded foldable supporting frame can fit in a narrow storage space.

Another advantage of the invention is to provide a foldable container and a foldable supporting frame thereof and its folding method, wherein the folded foldable supporting frame is easily and quickly unfolded for use without any tools or devices so as to save time and to minimize any complicated steps.

Another advantage of the invention is to provide a foldable container and a foldable supporting frame thereof and its folding method, wherein the foldable supporting frame can be used as a support for liquid containers or household utensils.

Another advantage of the invention is to provide a foldable container and a foldable supporting frame thereof and its folding method, wherein the foldable supporting frame can support the appliance at a predetermined height from the ground, so as to keep the water or cleaning liquid from the ground for maintaining relative hygiene and cleanliness.

Another advantage of the invention is to provide a foldable container and a foldable supporting frame thereof and its folding method, wherein the foldable container allows the water or cleaning liquid contained therein being automatically flowed out and drained.

Another advantage of the invention is to provide a foldable container and a foldable supporting frame thereof and its folding method, wherein the foldable container is easily cleaned and is easy to actuate and keep dry.

Another advantage of the invention is to provide a foldable container and a foldable supporting frame thereof and its folding method, wherein when the foldable supporting frame is folded, the container is automatically folded at the same time for facilitating the folding operation of the foldable container to convert from the unfolded mode to the folded mode.

Another advantage of the invention is to provide a foldable container and a foldable supporting frame thereof and its folding method, wherein when the foldable supporting frame is unfolded, the container is automatically unfolded for facilitating the unfolding operation of the foldable container to convert from the folded mode to the unfolded mode.

Another advantage of the invention is to provide a foldable container and a foldable supporting frame thereof and its folding method, wherein the container is pulled and folded to fold up the foldable supporting frame at the same time without any direct operation of the foldable supporting frame, so as to automatically move the foldable supporting frame from the unfolded mode to the folded mode.

Another advantage of the invention is to provide a foldable container and a foldable supporting frame thereof and its folding method, wherein when the foldable container is in the unfolded mode, the foldable container can be pulled by a pulling action to easily fold up the foldable container from the unfolded mode to the folded mode.

Another advantage of the invention is to provide a foldable container and a foldable supporting frame thereof and its folding method, wherein when the foldable container is at the unfolded mode, the foldable container allows a one-handed pulling operation to simplify the folding operation of the foldable container.

Another advantage of the invention is to provide a foldable container and a foldable supporting frame thereof and its folding method, wherein the foldable supporting frame can support the container to raise at a predetermined height so as to allow the user comfortably cleaning for children or pets, as an example. In other words, the foldable container allows the user to wash the child or pet in a standing position, which is beneficial to the health of the user, and is particularly beneficial to the back of the user.

Another advantage of the invention is to provide a foldable container and a foldable supporting frame thereof and its folding method, wherein the foldable supporting frame is supported and raised at a predetermined height for the user to operate comfortably without bending the back of the user.

Another advantage of the invention is to provide a foldable container and a foldable supporting frame thereof and its folding method, wherein the shape of the foldable supporting frame is restricted when it is folded without being pulled, such that the foldable supporting frame provides a stable supporting ability.

Another advantage of the invention is to provide a foldable container and a foldable supporting frame thereof and its folding method, wherein the foldable supporting frame will not be folded accidentally, such that foldable supporting frame will maintain its stability when it is unfolded and in use.

Additional advantages and features of the invention will become apparent from the description which follows and may be realized by means of the instrumentalities and combinations particular point out in the appended claims.

According to the present invention, the foregoing and other objects and advantages are attained by a foldable container, which comprises:

a foldable supporting frame;

at least one operation switch, wherein the operation switch is coupled with the foldable supporting frame to move the foldable supporting frame between an unfolded mode and a folded mode through a pulling operation of the operation switch; and a container body, wherein the container body is supported on the foldable supporting frame, wherein the container body has a surrounding edge defining an opening thereof surrounded by the edge, wherein at the unfolded mode, the opening of the container body is opened, wherein at the folded mode, the opening of the container body is closed, wherein the container body is automatically folded as the foldable supporting frame is moved from the unfolded mode to the folded mode.

In one embodiment of the present invention, the container body is connected to the operation switch, wherein the operation switch is actuated by a pulling operation of the container body in order to fold up the foldable supporting frame.

In one embodiment of the present invention, the foldable supporting frame is driven to fold by a folding of the container body, wherein the foldable supporting frame is maintained at the unfolded mode by the support of the operation switch, such that when the operation switch is actuated to release the support of the foldable supporting frame, and the foldable supporting frame is moved from the unfolded mode to the folded mode.

In one embodiment of the present invention, the foldable supporting frame comprises two folding arms and at least four supporting legs, wherein each of the folding arms is supported by the supporting legs, wherein the folding arms are pivotally connected with each other at the operation switch, wherein the folding arm and the supporting leg are pivotally rotated with each other.

In one embodiment of the present invention, the foldable supporting frame further comprises a pivot shaft, wherein each of the supporting legs is pivotally connected to each of the folding arms about the pivot shaft, wherein when the folding arm is rotated, the supporting leg is driven by the folding arm to rotate about the pivot shaft.

In one embodiment of the present invention, the folding arm further comprises a switch rod, wherein the switch rod is disposed at an end of one of the folding arms, wherein in the unfolded mode, the switch rod is supported by the operation switch to limit the movement between the two folding arms of the foldable support frame.

In one embodiment of the present invention, the folding arm further comprises a rotating rod, wherein two of the folding arms are pivotally connected to each other about the rotating rod.

In one embodiment of the present invention, the rotating rod is placed in the operation switch.

In one embodiment of the present invention, one of the folding arms is affixed to the operation switch, and another one is freely placed on the operation switch to form a fixed folding arm and a free rotatable folding arm respectively. The fixed folding arm and the rotating rod are arranged on the operation switch while the free rotatable folding arm is movably arranged on the operation switch about the rotating rod.

In one embodiment of the present invention, the end of the free rotatable folding arm is further transversely connected with the switch rod, wherein when the folding arm is unfolded, the free rotatable folding arm is parallel to the fixed folding arm while the switch rod is supported by the operation switch.

In one embodiment of the present invention, the operation switch comprises a main body, a slider and a resilient member, wherein the slider is movably disposed on the main body, the resilient member is connected to the main body, and the slider is affixed inside the main body.

In one embodiment of the present invention, the main body is constructed and shaped to retain at the end of the folding arm.

In one embodiment of the present invention, the free rotatable folding arm is rotatably held on the main body, wherein the fixed folding arm is firmly held on the main body.

In one embodiment of the present invention, the main body is constructed to have two fixed arm cavities, two free arm cavities and a slider cavity, wherein the end of the fixed folding arm is affixed to the fixed arm cavity, and the rotating rod is laterally arranged in the fixed arm cavity, wherein the end of the free rotatable folding arm is movably placed in the free arm cavity and is rotatably connected about the rotating rod.

In one embodiment of the present invention, the slider has a supporting end, wherein the supporting end is formed with a unidirectional inclined sloping surface, wherein the supporting end is pushed by the switch rod to move, and the supporting end is configured to support the weight of the switch rod without being pushed back.

In one embodiment of the present invention, the operation switch is actuated by pulling a handle provided on the container body in order to fold the foldable supporting frame, wherein the operation switch further comprises a pulling strap, wherein the slider has a pulling end firmly connected to the pulling strap, wherein the pulling strap has one end connecting to the handle and the opposed end connecting the pulling end of the slider.

In one embodiment of the present invention, the slider is moved back to the slider cavity under the elastic force of the resilient member by pulling the pulling strap.

In one embodiment of the present invention, each of the supporting legs is coupled to an extension leg to raise the height of the container body.

In one embodiment of the present invention, the container body is constructed to have a surrounding wall and a bottom wall sealingly connected to the surrounding wall to form a bowl shape of the container body, wherein the bottom wall has a drain port for draining the liquid contained in the container body.

In accordance with another aspect of the invention, the present invention comprises a foldable supporting frame, which comprises:

two folding arms;

at least four supporting legs; and at least one operation switch, wherein each of the folding arms is supported by the supporting leg, wherein the supporting leg is pivotally rotated with the folding arm, wherein the folding arms are pivotally connected to the operation switch, wherein the operation switch is arranged on the folding arm to move the folding arms between an unfolded mode and a folded mode via a pulling force, wherein the folding arm is maintained in the unfolded mode by a support of the operation switch, wherein when the switch is actuated to release the support of the folding arm, the folding arm is moved from the unfolded mode to the folded mode.

In accordance with another aspect of the invention, the present invention comprises a foldable supporting frame, which comprises:

a supporting frame; and at least one operation switch, wherein the switch is arranged on the supporting frame and is actuated through a pulling operation by a pulling force to move the supporting frame between an unfolded mode and a folded mode, wherein the supporting frame is maintained at the unfolded mode by a support of the operation switch, wherein the operation switch is actuated to release the support of the supporting frame so as to automatically move the supporting frame from the unfolded mode to the folded mode, wherein supporting frame comprises two folding arms and at least four supporting legs, wherein each of the folding arms is supported by the supporting legs, wherein the folding arms are pivotally connected to the operation switch and are asymmetrical to each other, wherein the folding arm and the supporting leg are pivot and rotate mutually.

In one embodiment of the present invention, the operation switch is movably connected to the supporting frame, wherein the operation switch is actuated via a pulling force to fold the supporting frame.

In one embodiment of the present invention, the supporting frame is opened to be unfolded and supported by the operation switch.

In one embodiment of the present invention, the supporting frame further comprises a pivot shaft, wherein each of the supporting legs is pivotally connected to each of the folding arms about the pivot shaft, wherein when the folding arm is rotated, the supporting leg is driven to rotate about the pivot shaft by the folding arm.

In one embodiment of the present invention, the end of the free rotatable folding arm is further connected transversely to the switch rod, wherein the switch rod can be supported by the switch, wherein when the folding arm is unfolded, the free rotatable arm is parallel to the fixed folding arm while the switch rod is supported by the operation switch.

In one embodiment of the present invention, the foldable supporting frame further comprises a container body, wherein the container body is arranged on the supporting frame, and the container body is folded to be closed as the supporting frame is folded, wherein the container body is opened as the supporting frame is unfolded.

In accordance with another aspect of the invention, the present invention comprises a foldable supporting frame, which comprises:

a supporting frame; and at least one operation switch, wherein the operation switch is arranged on the supporting frame and is actuated through a pulling operation by a pulling force to move the supporting frame between an unfolded mode and a folded mode, wherein the supporting frame is maintained at the unfolded mode by a support of the operation switch, wherein the operation switch is actuated to release the support of the supporting frame so as to automatically move the supporting frame from the unfolded mode to the folded mode, wherein the operation switch comprises a main body, a slider and a resilient member, wherein the slider is movably arranged on the main body, wherein the resilient member is connected to the main body and the slider, wherein the slider is affixed inside the main body.

In one embodiment of the present invention, the foldable supporting frame further comprises a container body, wherein the container body has an edge and an opening formed around the edge, wherein at the unfolded mode, the opening of the container body is opened, wherein at the folded mode, the opening of the container body is closed, wherein the container body is automatically folded as the foldable supporting frame is moved from the unfolded mode to the folded mode.

In accordance with another aspect of the invention, the present invention comprises a folding method for a foldable supporting frame, which comprises the steps of:

folding a container body via a pulling force; and when folding up the container body, folding the foldable supporting frame from the unfolded mode to the folded mode, wherein at the unfolded mode, the container body is supported by the foldable supporting frame, and at the folded mode, the foldable supporting frame and the container body are folded together.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
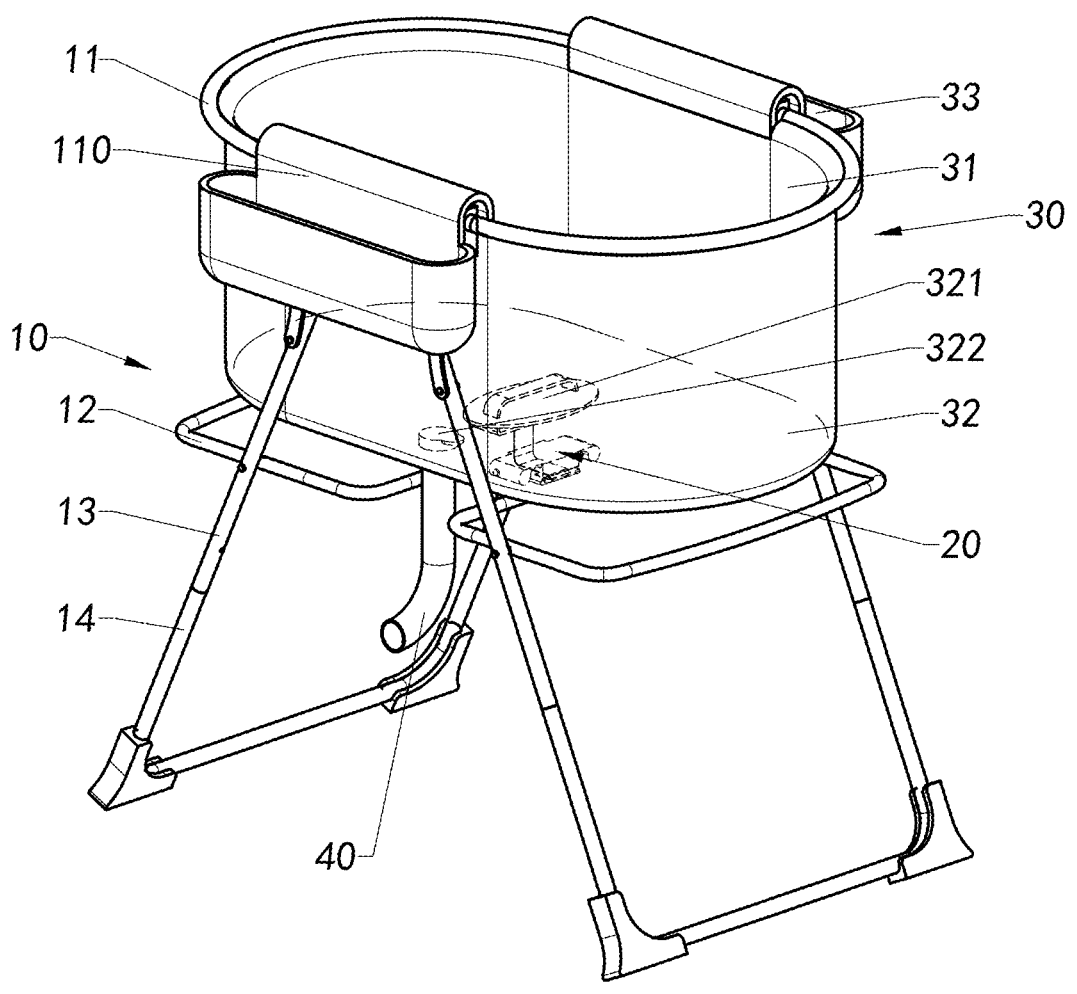
FIG. 1 is a perspective view of a foldable container at an unfolded mode according to a first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", "vertical", "horizontal", "top", "bottom", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one", "a", and "an" in the following description refer to "at least one" or "one or more"

in the embodiment. In particular, the term "a" in one embodiment may refer to "one" while in another embodiment may refer to "more than one". Therefore, the above terms should not be an actual numerical limitation of the elements of the present invention.

The present invention provides a foldable container which comprises a supporting frame which is preferably a foldable frame and a container body arranged on the supporting frame for containing water or liquid. The container body is fixed or detachably mounted on the supporting frame and is able to be unfolded for containing water or liquid, or folded for easy storage and transportation.

Referring to FIGS. 1 to 13 of the drawings, a foldable container according to a preferred embodiment of the present invention is illustrated, wherein the foldable container is suitable for containing water or liquid for cleaning therein to serve as a bathtub or a swimming pool. The foldable container comprises a foldable supporting frame 10, an operation switch 20 being operated through a pulling operation by a pulling force to operate and move the foldable supporting frame 10 between an unfolded mode and a folded mode, and a container body 30 being placed and supported on the foldable supporting frame 10. In other words, when the foldable supporting frame 10 is unfolded, the container body 30 is also unfolded for containing the liquid therein. When the foldable supporting frame 10 is moved to its folded mode, the container body 30 and the foldable supporting frame 10 are folded together, such that the entire foldable container can be stored in a folded state.

Preferably, when the foldable supporting frame 10 is unfolded, the container body 30 is automatically unfolded along with the folding operation of the foldable supporting frame 10. In other words, during the folding process of the foldable supporting frame 10, the container body 30 is automatically folded when the foldable supporting frame 10 is folded. Preferably, the foldable supporting frame 10 is a rigid frame that is made of a material selected from the group consisting of wood, metal, metal alloy, and plastic. Metal of the material of the foldable supporting frame 10 may be Iron, Copper, or Aluminium. The container body 30 is preferably a flexible body that is made of a flexible water-proof material such as PE (Polyethylene), PVC (Polyvinyl Chloride), PP (Polypropylene) and TPU (Thermoplastic Urethane). Accordingly, the flexible container body 30 is constructed to be easy to be folded up with a folding of the foldable supporting frame 10 and unfolded with an unfolding of the foldable supporting frame 10, when the foldable supporting frame 10 is unfolded, the foldable supporting frame 10 is supported in the unfolded mode by the operation switch 20 to provide a rigid support to the container body 30, and the operation switch 20 is able to be operated to release the rigid support of the foldable supporting frame 10 when the foldable supporting frame 10 is operated from the unfolded mode to the folded mode.

Figure 2:
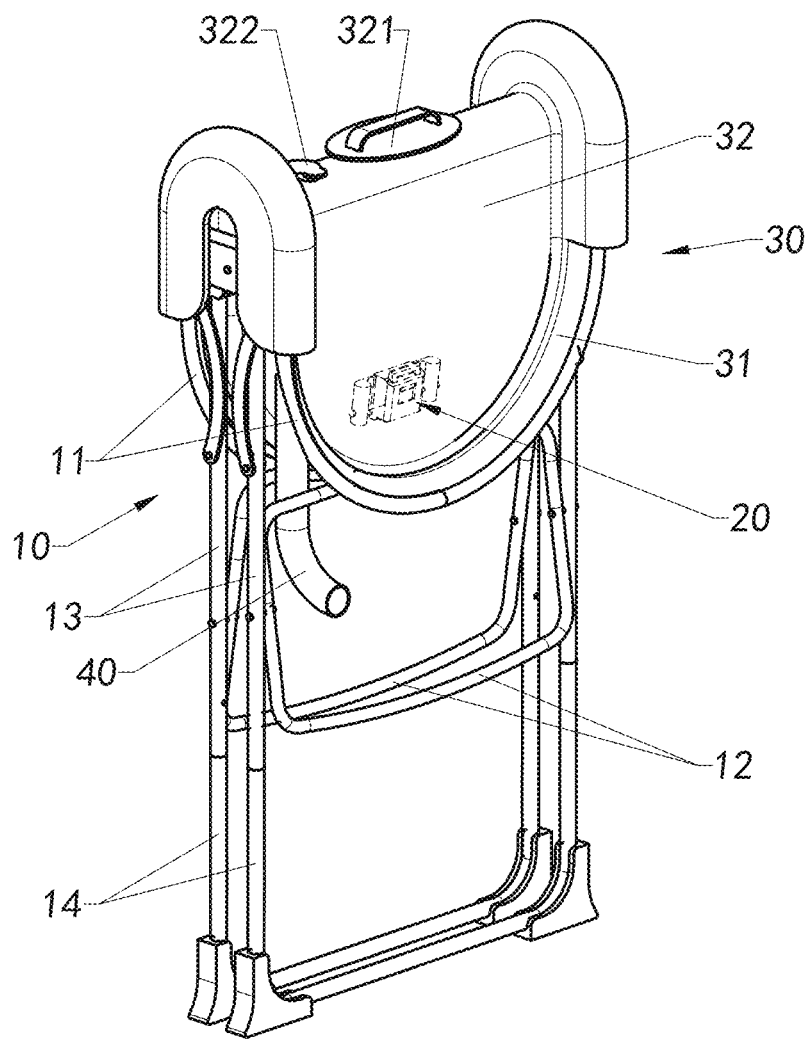
FIG. 2 is a perspective view of the foldable container at a folded mode according to the above first preferred embodiment of the present invention.

It is worth mentioning that the present invention provides a single pulling operation referring to the one-way mode when the foldable container is operated to moved and converted from the unfolded mode to the folded mode. In other words, operating the foldable container at the same direction can move the foldable container from the unfolded mode to the folded mode. Preferably, the single pulling operation in the present invention refers to the one-way pulling operation when operating the foldable container to move from the unfolded mode to the folded mode. In other words, pulling the foldable container at the same direction at one time can move the foldable container from the unfolded mode to the folded mode. It is appreciated that those skilled in the art should understand that pulling the foldable container at the same direction in different stages can also move the foldable container from the unfolded mode to the folded mode. For example, pulling the foldable container twice toward the same direction can also move the foldable container from the unfolded mode to the folded mode. As shown in FIGS. 1 and 2, the container body 30 according to the preferred embodiment is fixedly coupled at the foldable supporting frame 10. The container body 30 is driven by the foldable supporting frame 10 to be folded and unfolded. When the container body 30 is needed to be unfolded, the foldable supporting frame 10 is operated to unfold the container body 30. It is worth mentioning that the foldable container can be unfolded as a whole system without any additional step. No additional step is required to open up the container body 30 or improve the stability of the container body 30. When the foldable supporting frame 10 is operated to expand and unfolded, the container body 30 is simultaneously expanded at its setup state. In addition, folding up the container body 30 by folding the foldable supporting frame 10 is similar. When the foldable supporting frame 10 is folded, the foldable supporting frame 10 will drive the container body 30 to fold. Therefore, the folding or unfolding of the foldable container can be easily operated.

Figure 3A:
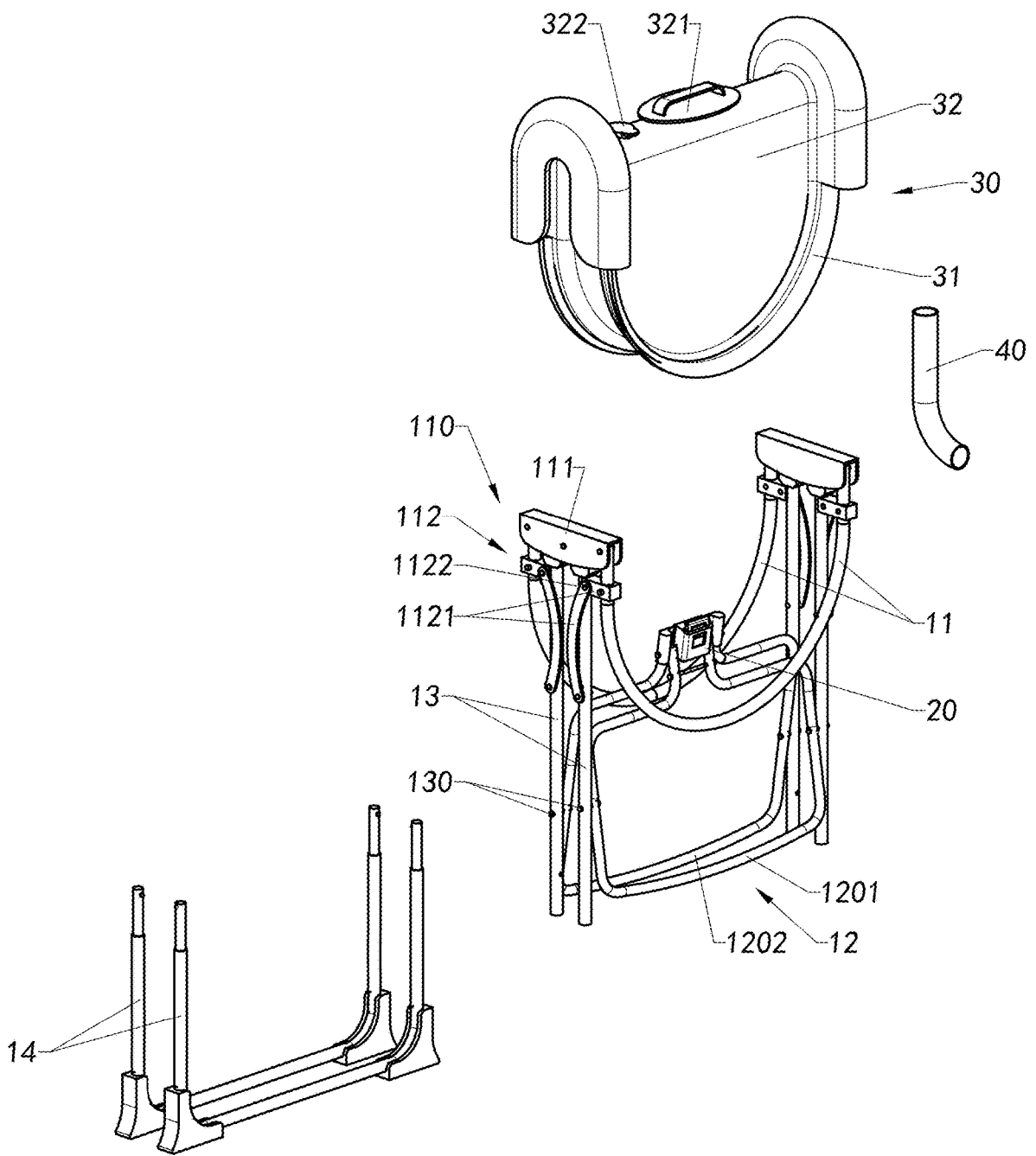
FIG. 3A is an exploded perspective view of the foldable container at the folded mode according to the above first preferred embodiment of the present invention.

As shown in FIG. 3A, the foldable supporting frame 10 comprises at least two top supporting arms 11, at least two folding arms 12, and at least four supporting legs 13. Each of the top supporting arms 11 is placed on the folding arm 12 and the supporting leg 13, wherein the folding arm 12 and the top supporting arm 11 are supported by the supporting leg 13. Preferably, the number of the top supporting arms 11, the folding arms 12 and the supporting legs 13 are corresponding, wherein each of the top supporting arm 11 and each of the folding arms 12 are correspondingly supported by the supporting leg 13.

It is worth mentioning that the folding arms 12 are pivotally connected to each other by the operation switch 20. The rotation of the folding arm 12 is configured to drive the folding or unfolding movement of the top supporting arm 11 and the supporting leg 13. When the foldable supporting frame 10 is in the folded mode, the two folding arms 12 are arranged to be folded and overlapped each other. When the foldable supporting frame 10 is in the unfolded mode, the two folding arms 12 are arranged to be unfolded to open and extended flatly. Therefore, when the folding arm 12 is folded, the top supporting arm 11 and the supporting leg 13 are folded following the folding operation of the folding arm 12. Therefore, by only folding the folding arm 12, the entire foldable supporting frame 10 is folded, which is convenient in operation. When the foldable supporting frame 10 is folded, the container body 30 is correspondingly folded.

As shown in FIG. 3A, the operation switch 20 is connected to two ends of the two folding arms 12 to control the foldable supporting frame 10 to switch between folding and unfolding. The switch 20 can be further operated by being pulled to move the folding arm 12 from the unfolded mode to the folded mode. In other words, when the foldable supporting frame 10 is in the unfolded mode, the operation switch 20 is pulled to drive and move the folding arm 12. In other words, the folding arm 12 is folded due to gravity and loss of supportability. Though the pulling operation, the operation switch 20 is pulled to fold the foldable supporting frame 10.

Specifically, the two folding arms 12 are pivotally connected with each other around a rotating rod 121, wherein the rotating rod 121 is placed between the ends of the two folding arms 12. The rotating rod 121 is installed into the operation switch 20. The two folding arms 12 are rotated around the operation switch 20, wherein the operation switch 20 is configured to restrict the rotations of the folding arms 12 relative to each other. According to the first embodiment, one of the folding arms 12 is fixed to the operation switch 20, while another folding arm 12 is relatively free to rotate relative to the operation switch 20. In other words, one of the folding arms 12 is defined as a fixed folding arm 1202, and another folding arm 12 is a free rotatable folding arm 1201. The fixed folding arm 1202 is installed into the operation switch 20 together with the rotating rod 121. The free rotatable folding arm 1201 is rotatably coupled at the operation switch 20 around the rotating rod 121.

In addition, the rotation of the fixed folding arm 1202 and the free rotatable folding arm 1201 around the rotating rod 121 are asymmetrical. In other words, when the fixed folding arm 1202 and the free rotatable folding arm 1201 are folded with each other, the fixed folding arm 1202 and the free rotatable folding arm 1201 are staggered and stacked with each other and will not contact or collide with each other. On one side, the fixed folding arm 1202 and the free rotatable folding arm 1201 will not be mechanically damaged during the folding and unfolding operations. On the other side, after folding, a retention channel is formed between the fixed folding arm 1202 and the free rotatable folding arm 1201.

It is worth mentioning that the end of the free rotatable folding arm 1201 is further transversely connected to a switch rod 122. When the folding arm 12 is flatly unfolded, the switch rod 122 is firmly supported by the operation switch 20, wherein the free rotatable folding arm 1201 is parallel to the fixed folding arm 1202. When the switch rod 122 is supported, the free rotatable folding arm 1201 is relatively supported on the same side of the fixed folding arm 1202. When the operation switch 20 is configured to keep supporting the switch rod 122, the free rotatable folding arm 1201 is configured to remains relative parallel to the fixed folding arm 1202. When the switch rod 122 is released from the operation switch 20, the free rotatable folding arm 1201 will lose its support. Under the action of gravity force, the free rotatable folding arm 1201 will rotate around the rotating rod 121 and fold toward the fixed folding arm 1202. In other words, when the switch rod 122 is supported by the operation switch 20, due to the restriction of the operation switch 20, the folding arm 12 is unfolded and is difficult to change its position. Once the switch rod 122 is detached from the operation switch 20, the folding arm 12 can rotate around the rotating rod 121 to be folded. Therefore, the folding arm 12 is controlled by the operation switch 20 for controlling the movement of the folding arm 12, wherein the folding position or the unfolding position of the foldable supporting frame 10 is indirectly controlled by the operation switch 20.

In addition, the supporting legs 13 and the folding arms 12 are pivotally connected to pivot shafts 130 respectively. When the folding arm 12 is operated to rotate around the rotating rod 121, the angle and distance between the folding arms 12 are changed while the supporting leg 13 is driven to rotate around the pivot shafts 130. Each of the supporting legs 13, each of the folding arms 12, and the pivot shaft 130 are formed into a rotatable X-shaped frame. Since the movements of the folding arms 12 are transmitted to the supporting legs 13, the supporting legs 13 are automatically moved for being further folded or unfolded via the folding arms 12.

Figure 3B:
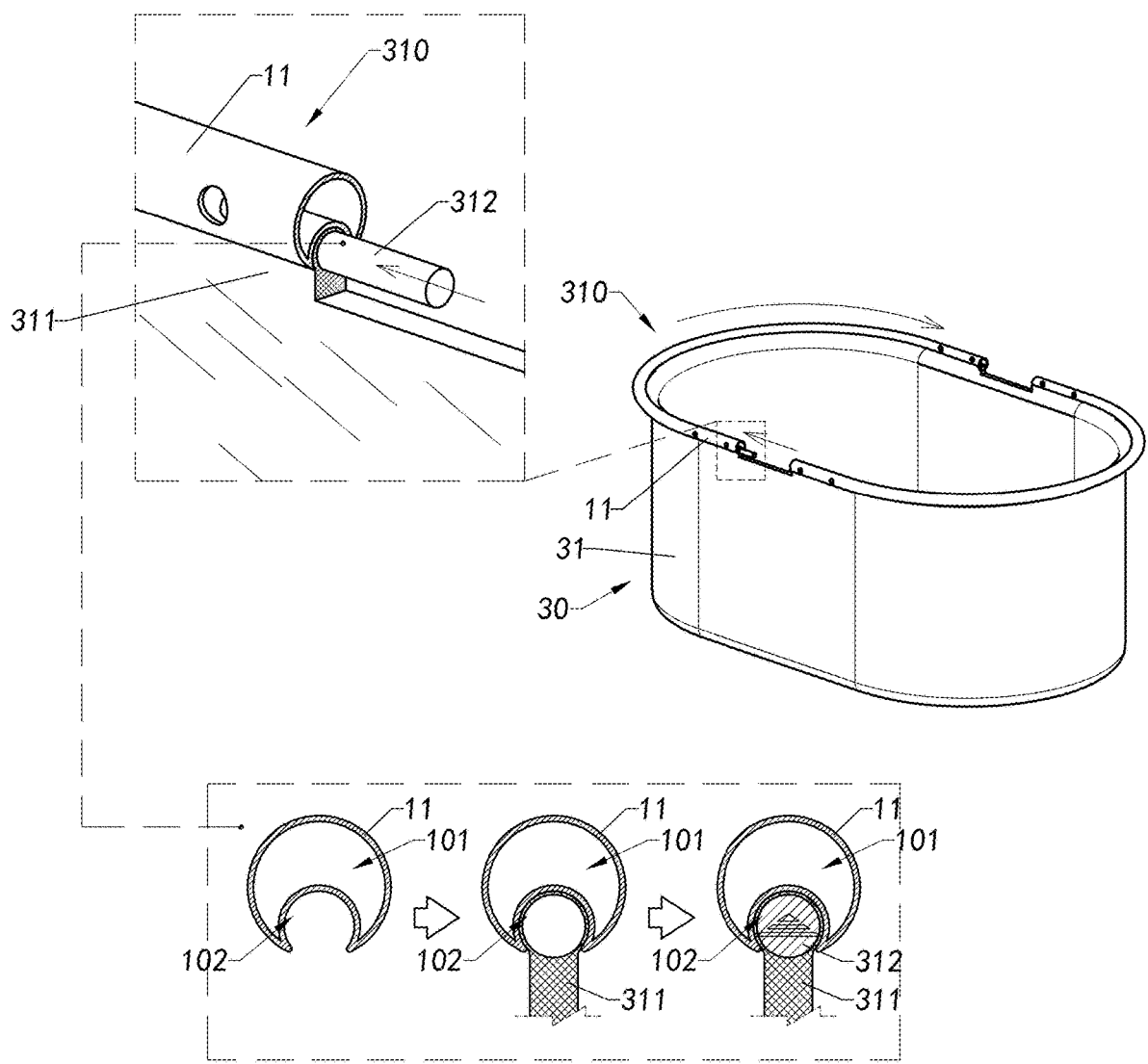
FIG. 3B illustrates the supporting structure of the foldable container at the unfolded mode according to the above first preferred embodiment of the present invention.

Furthermore, as shown in FIG. 3B, the container body 30 is detachably connected to the foldable supporting frame 10.

The container body 30 can be further removed from the folding supporting frame 10 for being and cleaned or disinfected.

Furthermore, the top supporting arm 11 is driven to rotate by the supporting leg 13 via a folding assembly 110, wherein the folding assembly 110 is installed at the top of the supporting leg 13. When the supporting leg 13 is folded or unfolded as the folding arm 12 rotates, the top supporting arm 11 is driven to rotate around the folding assembly 110. Each of the supporting legs 13, each of the top supporting arms 11, and the folding assembly 110 are formed into a rotatable inversed V-shaped frame. Since the folding assembly 110 is driven, it is not necessary to fold or unfold the supporting leg 13 because the movement of the folding assembly 110 will be transmitted to the supporting leg 13.

In detail, the folding assembly 110 comprises a rotatable base 111 and a linkage unit 112. The rotatable base 111 is coupled at the end of the top supporting arm 11 to receive the upper end of the supporting leg 13 in the rotatable base 111. The linkage unit 12 comprises two linkage members 1121 respectively mounted on the top end of the supporting leg 13 and the end of the top supporting arm 11. The linkage members 1121 are connected by link shafts 1122, so that the angle between each top supporting arm 11 and each supporting leg 13 can be controlled and has a maximum angle limitation. Each of the top supporting arms 11, each of the supporting legs 13 and the linkage member 1121 are formed in an A shape, wherein the top supporting arms 11 will drive the supporting legs 13 to move, while the supporting legs 13 will drive the top supporting arm 11 to move around the rotatable base 111.

Preferably, by operating the operation switch 20 to release the switch rod 122 and to fold the folding arm 12, the supporting leg 13 and the top supporting arm 11 are corresponding folded. Preferably, the top supporting arm 11 is expanded to further drive the folding arm 12 to be supported on the operation switch 20 and to drive the supporting leg 13 to expand.

Figure 5:
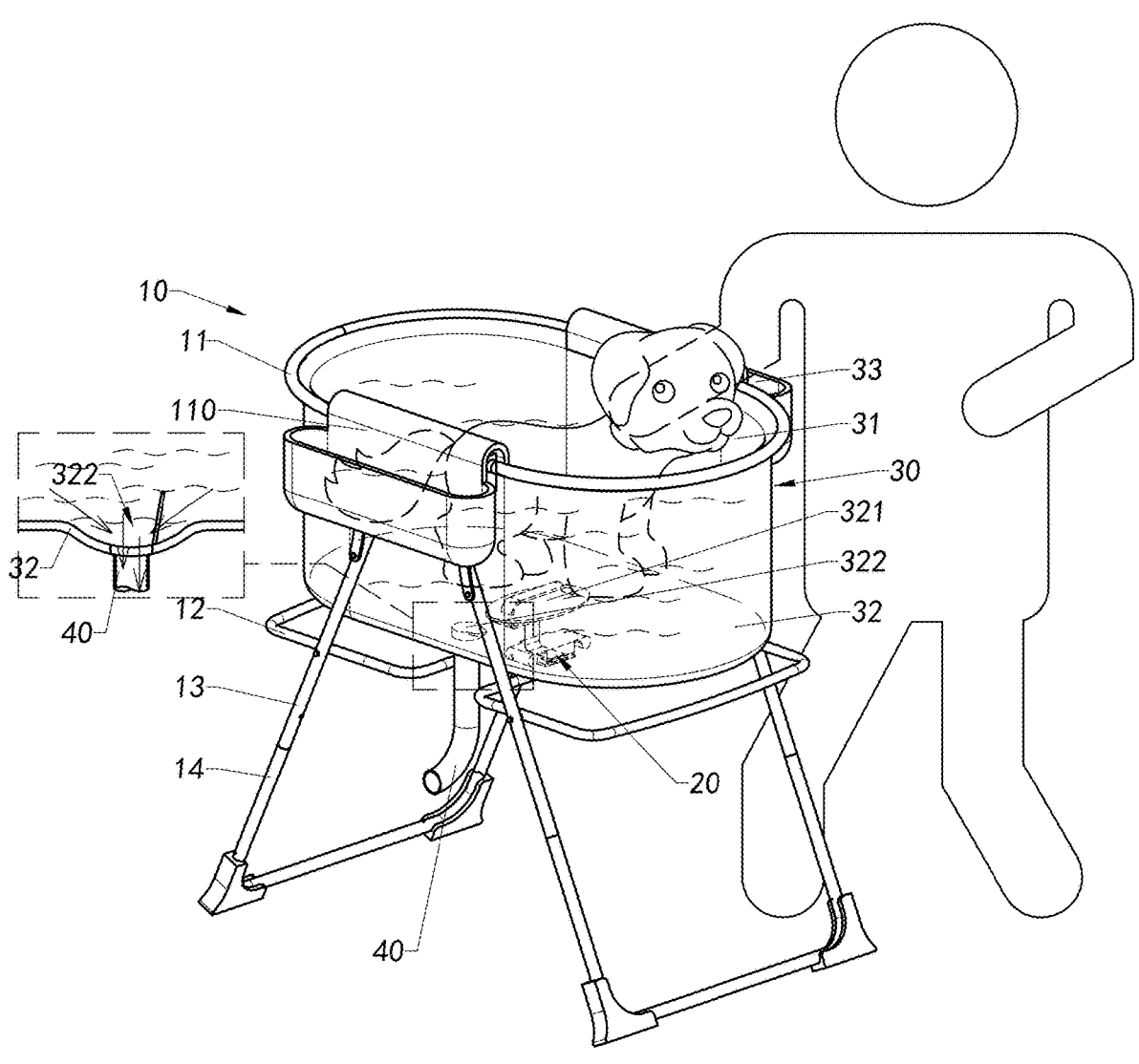
FIG. 5 illustrates an application of the foldable container at the unfolded mode according to the above first preferred embodiment of the present invention.

Furthermore, each of the supporting legs 13 is configured for correspondingly installing an extension leg 14 for increasing the height of the top supporting arm 11 and keeping the container body 30 on the top supporting arm 11 in a preset position, as shown in FIG. 5. Through the extension legs 14, the container body 30 is supported and raised above the ground for hygienic and cleaning purpose while the water or cleaning liquid is contained in the container body 30. As a result, the user can comfortably use the container body 30 without bending the user's body.

The container body 30 comprises a surrounding wall 31 and a bottom wall 32 sealingly connected to the surrounding wall 31 to form the container body 30 having a bowl shape and a surrounding edge 310 defining an opening thereof surrounded by the edge 310. The edge 310 of the surrounding wall 31 is disposed on the top supporting arm 11 of the foldable supporting frame 10. In one alternative mode of the present invention, the container body 30 is detachably mounted on the top supporting arm 11 for replacement. The container body 30 further comprises at least one pocket 33 placed on the surrounding wall 31. The pocket 33 is configured for keeping other items therein to facilitate the reaching of items when using liquid for cleaning or playing in the container body 30.

Preferably, as shown in FIG. 3B, the edge 310 of the surrounding wall 31 is constructed to have a fixing rib 312 and an edge sleeve 311, wherein the fixing rib 312 is configured to pass through the edge sleeve 311, such that the edge 310 is supported with its shape. The top supporting arm 11 further comprises a rod body 101, wherein the rod body 101 has a fixing cavity 102 formed on one side of the rod body 101. The fixing cavity 102 is extended through the rod body 101, wherein the edge 310 of the surrounding wall 31 is installed inside the fixing cavity 102.

Specifically, the fixing rib 312 is extended into the fixing cavity 102 of the rod body 101, such that the edge sleeve 311 to be carried is suspended and fixed to the rod body 101. In the first embodiment, the fixing cavity 102 of the rod body 101 has a U-shaped configuration, wherein the fixing rib 312 is configured to enter from an opening of the fixing cavity 102 into the fixing cavity 102. Furthermore, the edge sleeve 311 is formed in a U-shape and is also connected to the rod body 101 of the top supporting arm 11 in a U-shape. When the surrounding wall 31 is needed to be disassembled, the fixing rib 312 relatively removed from the fixing cavity 102 of the rod body 101, wherein the fixing rib 312 is completely removed from the top supporting arm 11. Preferably, the rod body 101 is pulled to release the supportability of the edge sleeve 311. More preferably, the fixing rib 312 is detachably connected to the sleeve edge 311, such that the sleeve edge 311 can be further folded or cleaned.

It is worth mentioning that the bottom wall 32 has a drain port 322 for draining the water or cleaning liquid in the container body 30. Preferably, the drain port 322 is set at the lowest location or area of the bottom wall 32 for effectively draining the liquid in the container body 30. The drain port 322 is able to connect a drain pipe 40 to allow liquid to flow out of the container body 30 along the drain pipe 40. A drain plug can be detachably plugged at the drain port 322 to prevent the liquid being drained out the container body 30 through the drain port 322.

Figure 7A:
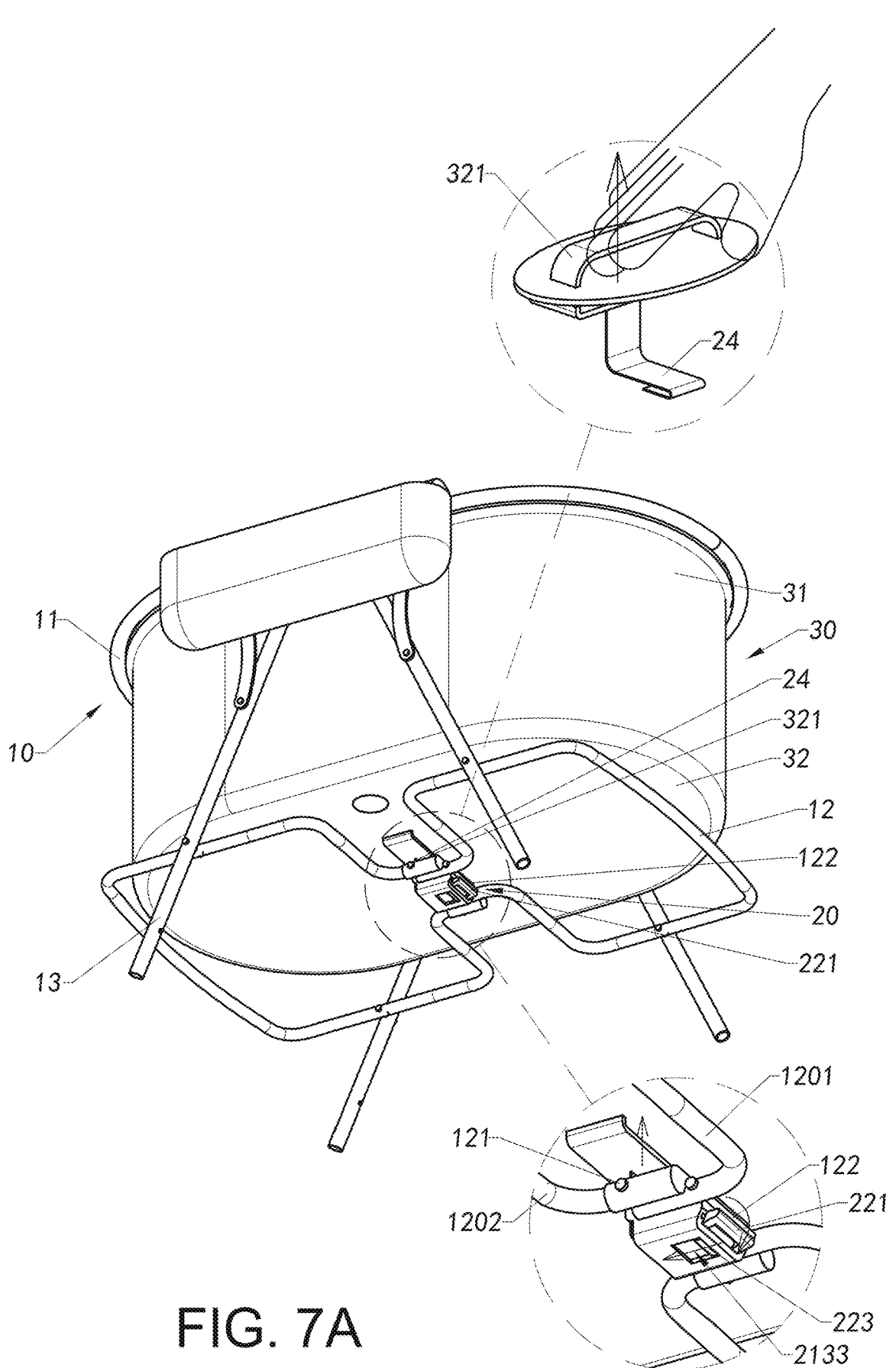
FIGS. 7A to 7C illustrate a folding operation of the foldable container according to the above first preferred embodiment of the present invention.
Figure 7B:
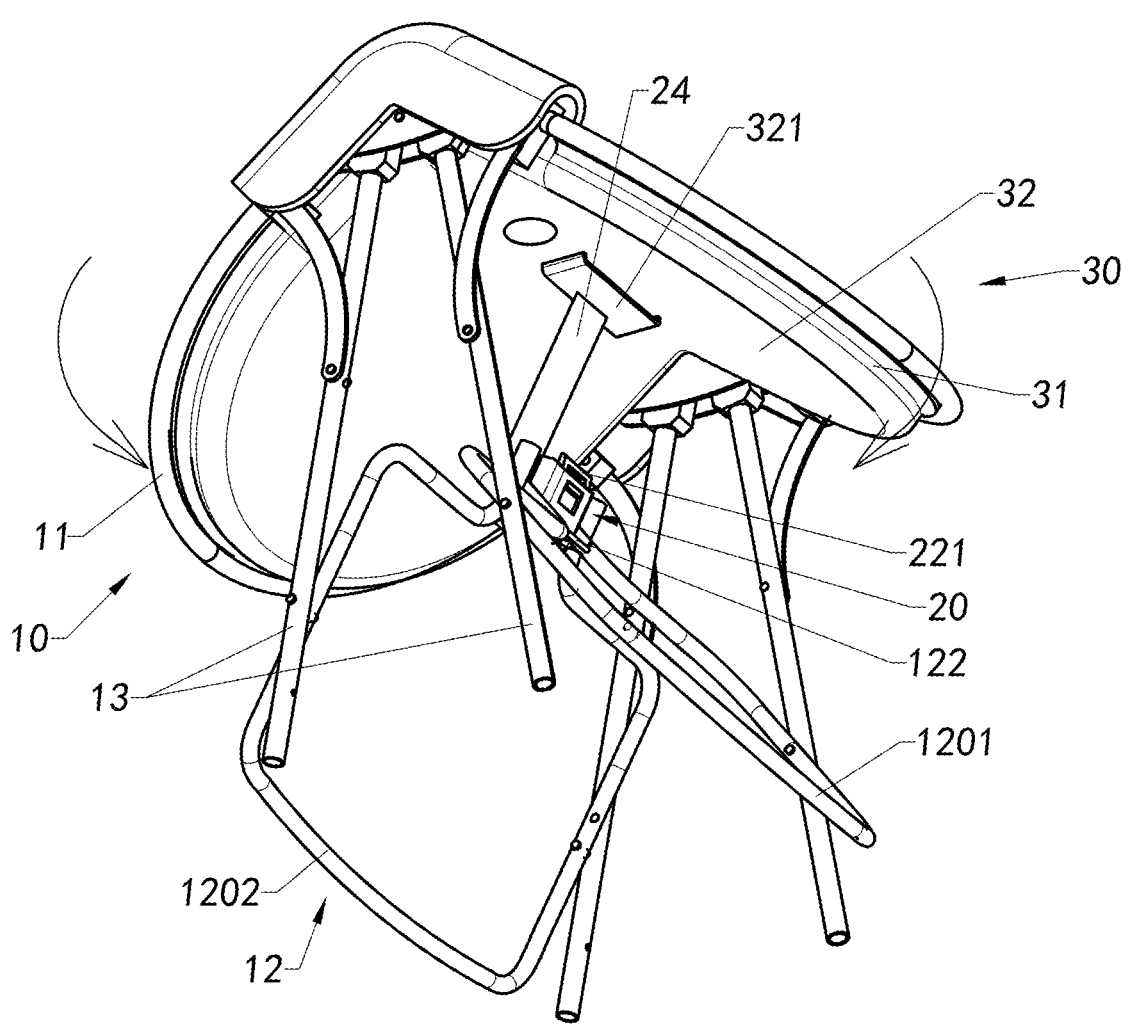
Figure 7C:
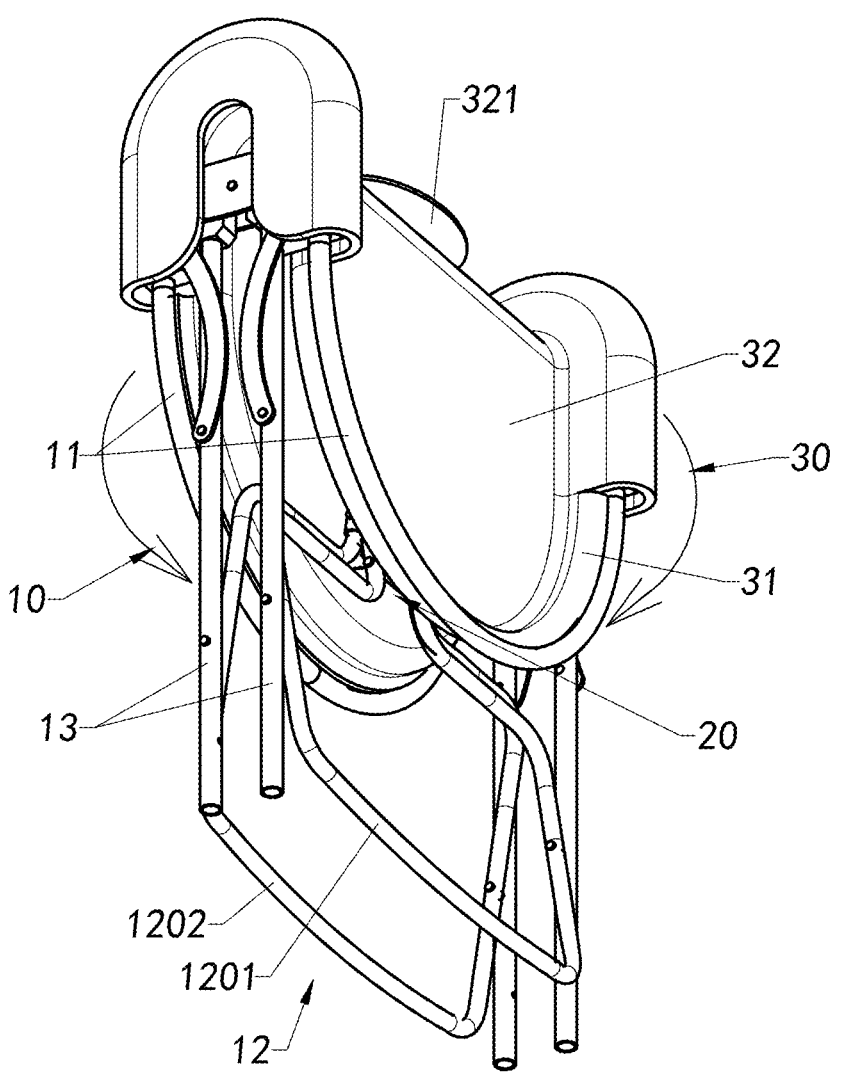
Figure 8:
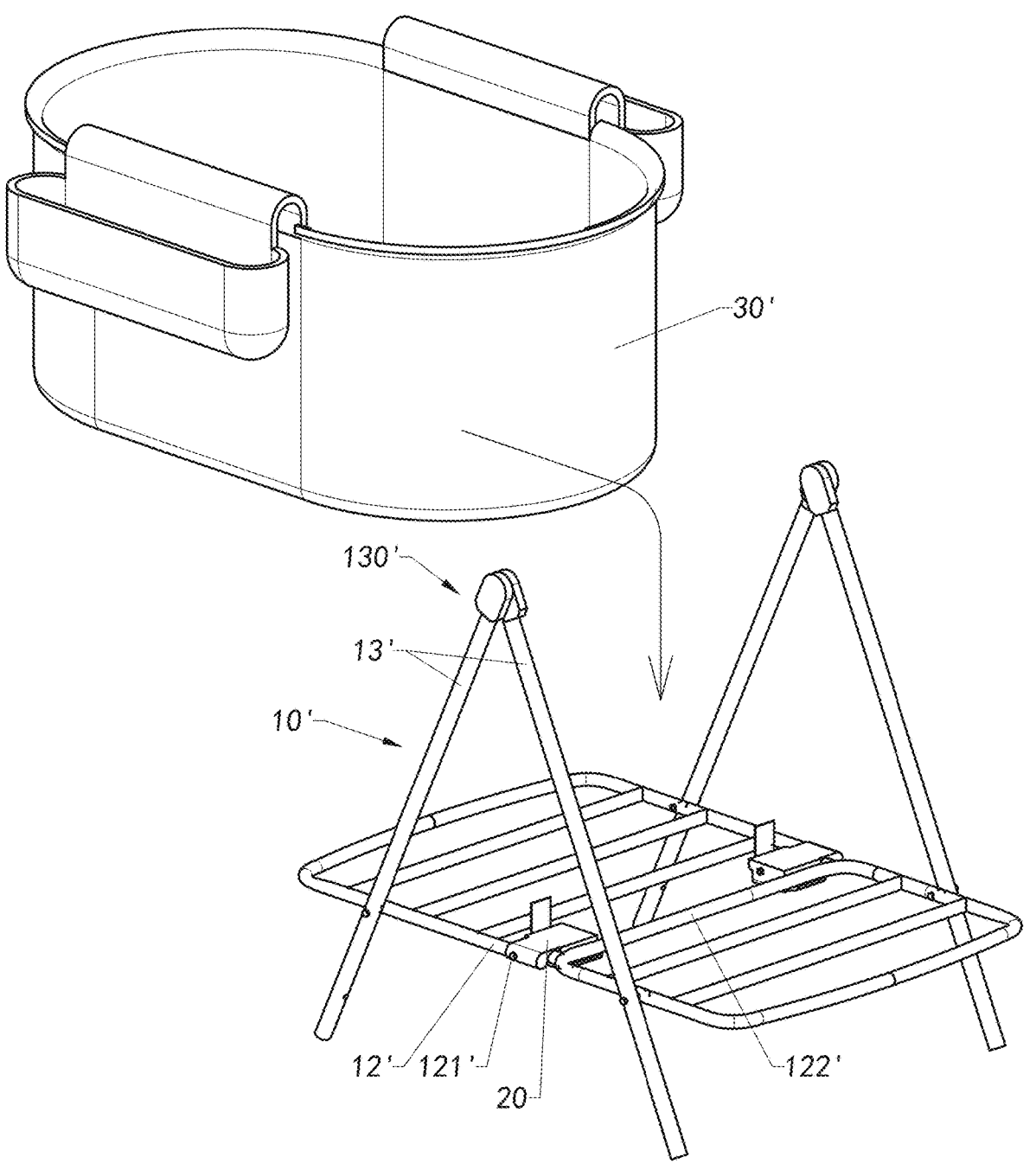
FIG. 8 is a perspective view of a foldable container at an unfolded mode according to a second preferred embodiment of the present invention.

Particularly, as shown in FIGS. 2 and 7C, when the foldable supporting frame 10 is in the folded mode, the drain pipe 40 is located in the retention channel. The retention channel is formed with a predetermined width because of the asymmetric folding of the fixed folding arm 1202 and the free rotatable folding arm 1201. The drain pipe 40 is located in the retention channel and will not be pressed by the fixed folding arm 1202 and the free rotatable folding arm 1201. In other words, the drain pipe 40 is held in the retention channel at the folded mode, wherein the drain pipe 40 is enclosed between two sides of the fixed folding arm 1202 and the free rotatable folding arm 1201. Therefore, the drain pipe 40 will not be damaged by any external impact, and the drain pipe 40 is kept in a certain position to avoid any unwanted movement, vibration or swinging.

The bottom wall 32 further comprises a handle 321 connected to the operation switch 20. The operation switch 20 can be operated by operating the handle 321 to fold the folding arm 12.

Figure 4:
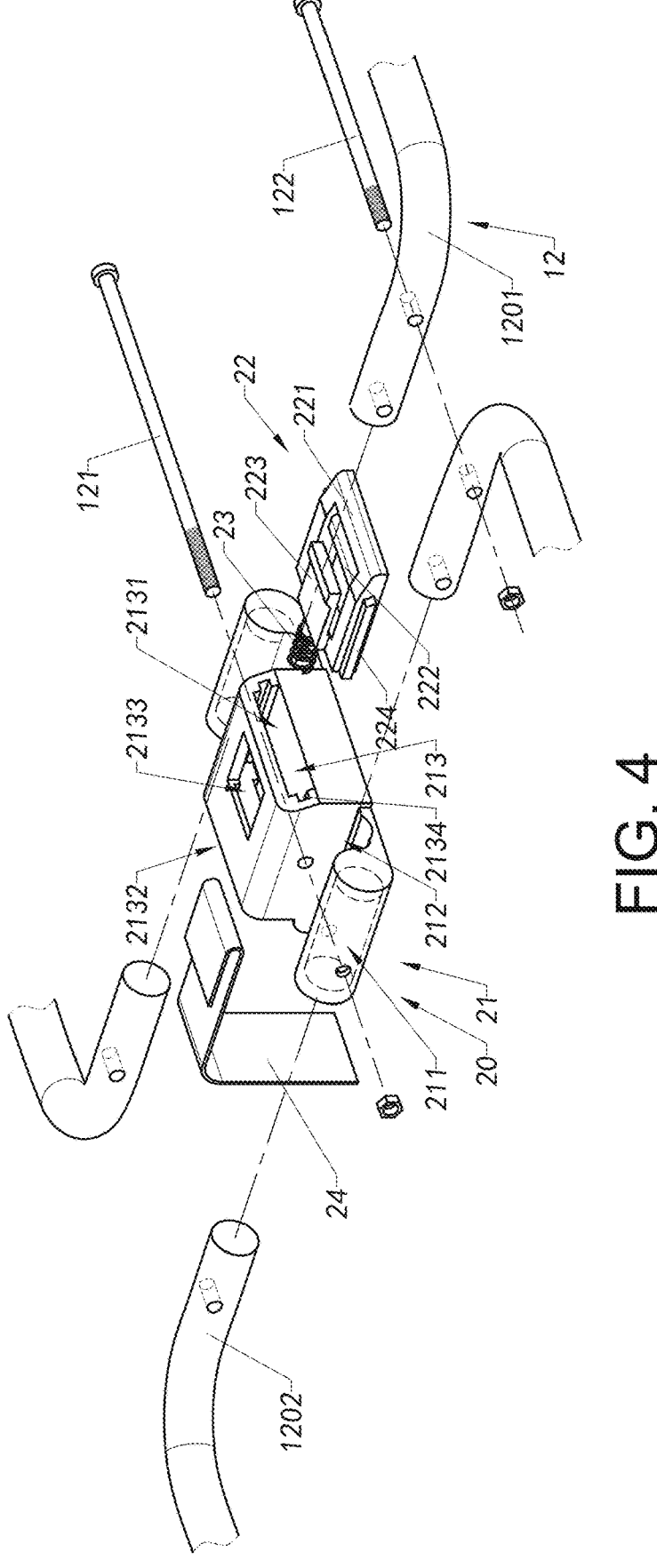
FIG. 4 is an exploded perspective view of the supporting frame of the foldable container according to the above first preferred embodiment of the present invention.

As shown in FIG. 4, the operation switch 20 comprises a main body 21, a slider 22 movably coupled at the main body 21, and a resilient member 23 connecting the main body 21 to the slider 22 so as to fasten the slider 22 in the main body 21. The main constructed to have a shape for being held on the end of one of the folding arms 12. Particularly, the main body 21 is rotatably coupled at the free folding arm 1201 and fixedly coupled at the fixed rotatable folding arm 1202. It is worth mentioning that the slider 22 is partially protruded out of the main body 21 due to the elastic force of the resilient member 23. When the resilient member 23 is configured to push the slider 22 protruding out of the main body 21, the slider 23 can support the folding arm 12 in place. Once the slider 22 is configured to move inside the main body 21, the folding arm 12 will lose support, such that the folding arm 12 will fall down and rotate around the rotating rod 121.

When the folding arm 12 is no longer supported by the slider 22 of the operation switch 20, the folding arm 12 is folded. As a result, the two folding arms 12 are folded to overlap each other.

When the free rotatable folding arm 1201 is rotated, is supported by the slider 22, and is parallel to the fixed folding arm 1202, the folding arm 12 is unfolded flatly, while the folding supporting frame 10 is in the unfolded mode. When the slider 22 is configured to move back in the main body 21, the free rotatable folding arm 1201 is configured to drop and overlappedly fold with the fixed folding arm 1202.

According to the preferred embodiment, the main body 21 is formed with two fixed arm cavities 211, two free arm cavities 212 and a slider cavity 213. The end of the fixed folding arm 1202 is fixedly coupled in the fixed arm cavity 211, and the rotating rod 121 is configured to pass through the fixed arm cavity 211. The end of the free rotatable folding arm 1201 is movably arranged in the free arm cavity 212 and rotatably connected around the rotating rod 121. Therefore, the rotating rod 121 is configured to pass through the fixed arm cavity 211 and the free arm cavity 212. In other words, both ends of the free rotatable folding arm 1201 and both ends of the fixed folding arm 1202 surround the rotating rod 121. The fixed folding arm 1202 and the fixed arm cavity 211 of the main body 21 remain stationary, wherein the free rotatable folding arm 1201 is configured to rotate in the free arm cavity 212 of the main body 21. The slider 22 is movably disposed in the slider cavity 213 to be moved in or pushed by the resilient member 23 to move out of the slider cavity 213.

The switch rod 122 is located outside of the main body 21 and is configured to apply a pushing force to the slider 22 to move the slider 22 backward in the slider cavity 213. When the switch rod 122 is lifted to force the slider 22 to move in, and when the free rotatable folding arm 1201 is rotated around the rotating rod 121 to expand, the slider 22 is pushed to move back into the slider cavity 213. When the switch rod 122 passes over the slider 22 that no force is applied to the slider 22, the slider 22 is pushed out of the slider cavity 213 by the resilient member 213 to protrude out of the slider cavity 213 again. The switch rod 122 is then supported by the slider 22 when protrude out of the slider cavity 213. Under this circumstances, the switch rod 122 cannot push the slider 22 back, and the slider 22 bears the weight of the switch rod 122. When the slider 22 is kept protruding out of the slider cavity 213 and the switch rod 122 is still supported by the slider 22 of the operation switch 20, the free rotatable folding arm 1201 and the fixed folding arm 1202 are relatively unfolded, while the folding arm 12 is laid flat and stable.

The slider 22 has a supporting end 221 defining a unidirectional inclined sloping surface. The switch rod 122 is configured to push the supporting end 221 along the sloping surface thereof. The supporting end 221 of the slider 22 is configured to support the switch rod 122 on the planar surface thereof to bear the weight of the switch rod 122 so as to prevent the switch rod 122 being pushed back.

The slider 22 has a pulling end 222 firmly connected to a pulling strap 24. By pulling out the pulling strap 24, the slider 22 is configured to resist the elastic force of the resilient member 23 and to move backward in the slider cavity 213.

The slider 22 further comprises a stopper 223 protruded from the main body 21 to engage with the slider 22 inside the slider cavity 213 for preventing the slider 22 from moving out of the slider cavity 213 via the pushing force of the resilient member 23. In other words, the slider 22 is pushed by the resilient member 23 and is held by the stopper 223 in order to be held in the slider cavity 213. Also, the slider 22 is restricted to move along a specific path in the slider cavity 213. According to the preferred embodiment, the slider 22 further comprises at least one slide rail 2134 formed inside the slider cavity 213 to limit the moving direction and distance of the slider 22. The slider 22 further comprises at least one sliding leg 224, wherein the sliding leg 224 is correspondingly engaged with the sliding rail 2134 of the sliding block cavity 213.

The slider cavity 213 has a supporting opening 2131 corresponding to the free rotatable folding arm 1201 and a pulling opening 2132 corresponding to the fixed folding arm 1202. The slider 22 is pushed by the resilient member 23 to protrude out from the supporting opening 2131, wherein when the slider 22 is pressed by the switch rod 122, the slider 22 is pulled back toward the pulling opening 2132. The slider cavity 213 further has a limitation window 2133. The limitation window 2133 is preferably located at the top of the main body 21. The limitation window 2133 is configured to accommodate the stopper 223 of the slider 22 inside the limitation window 2133. The limitation window 2133 is configured to block the stopper 223 and move within the area of the limitation window 2133. In other alternative modes, the limitation window 2133 can be shaped as a groove to limit the movement of the stopper 223.

The pulling strap 24 is extended out of the main body 21 through the pulling opening 2132 from the pulling end 222 of the sliding block 22. When the pulling strap 24 is actuated to pull the slider 22 back to the slider cavity 213, the supporting end 221 is moved backward, such that the support of the switch rod 122 is dismissed due to the backward movement of the supporting end 221. The stopper 223 is restricted to continuously move backward by the limitation window 2133, so as to avoid further movement of the slider 22.

The pulling strap 24 has one end connecting to the handle 321 at the bottom wall 21 of the container body 30 and an opposed end connecting to the slider 22. Therefore, when the handle 321 is pulled to lift the container body 30, the pulling strap 24 is configured to transmit the pulling force to pull the slider 22 to move the slider 22 into the slider cavity 213. Only one action of pulling the handle 321 of the container body 30 is required for operating the operation switch to fold the foldable supporting frame 10.

Figure 6A:
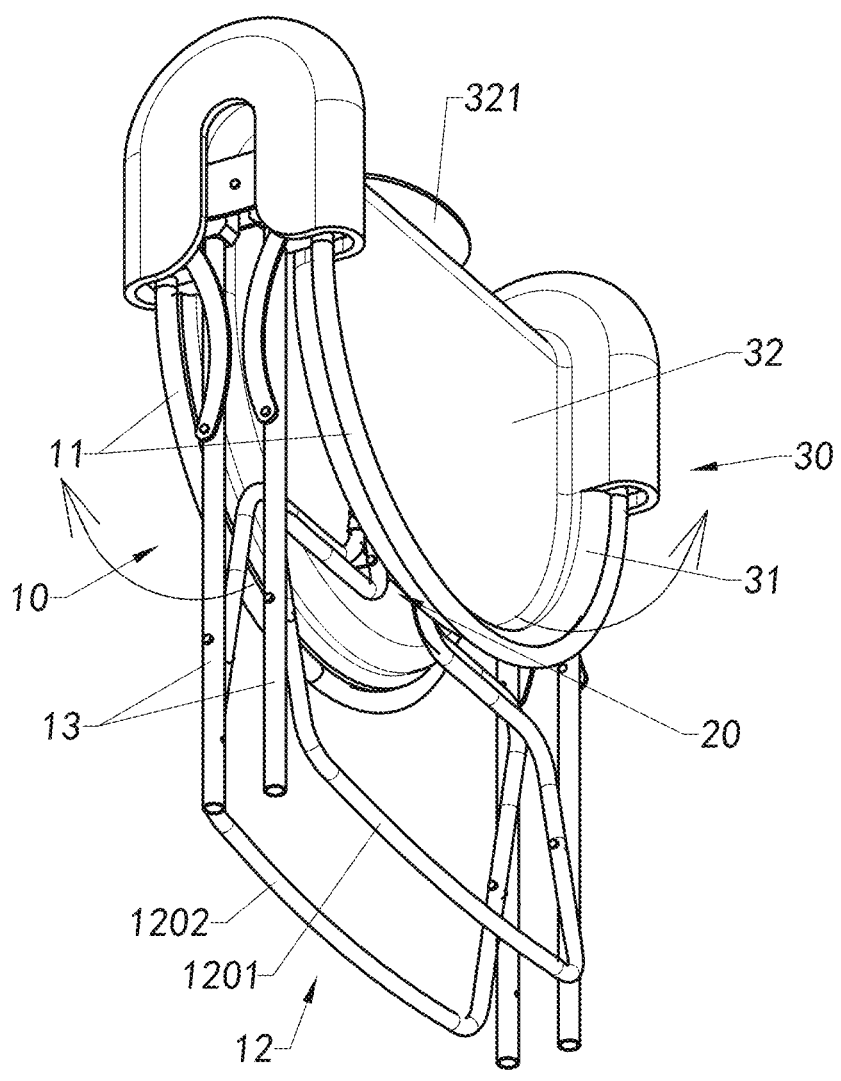
FIGS. 6A to 6C illustrate an unfolding operation of the foldable container according to the above first preferred embodiment of the present invention.
Figure 6B:
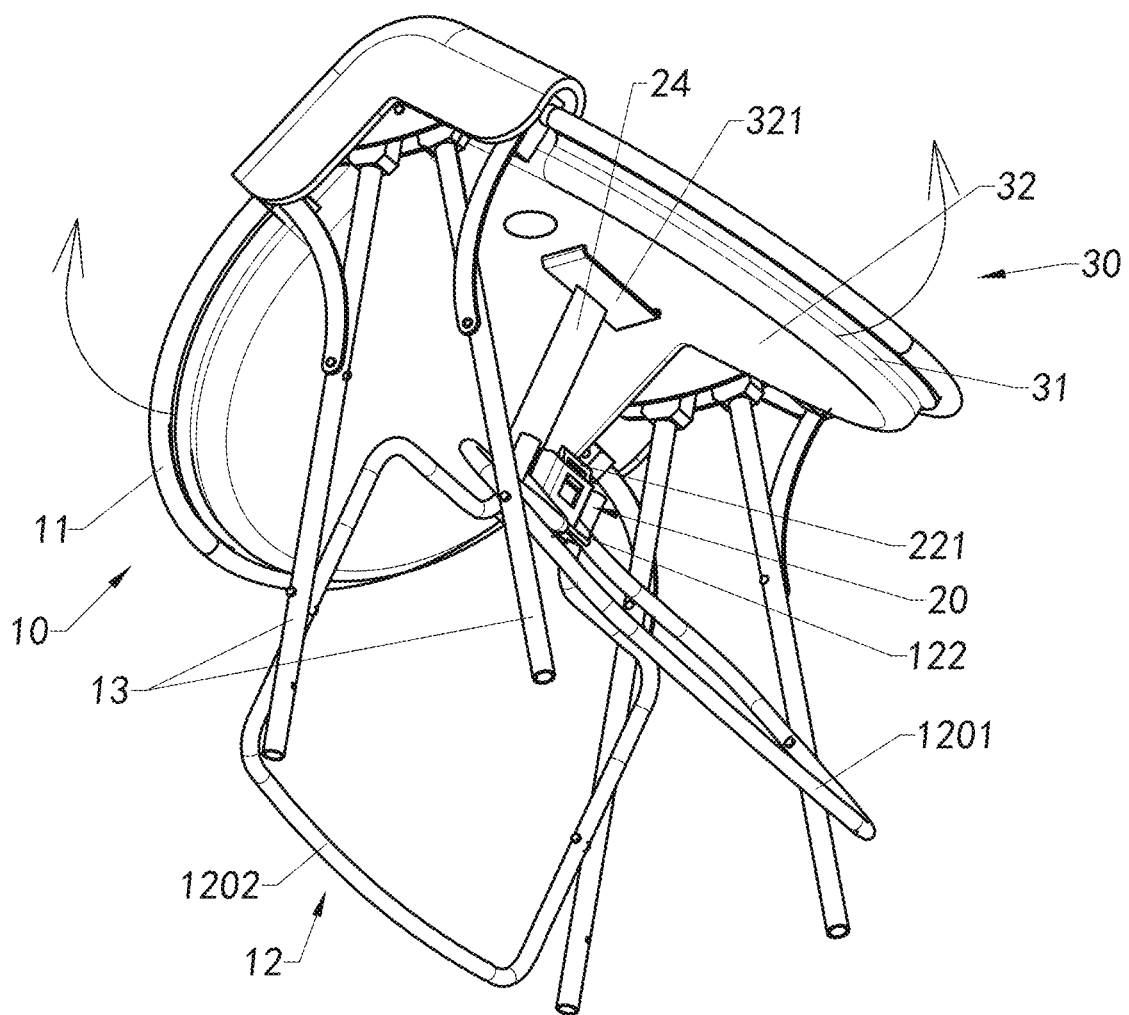
Figure 6C:
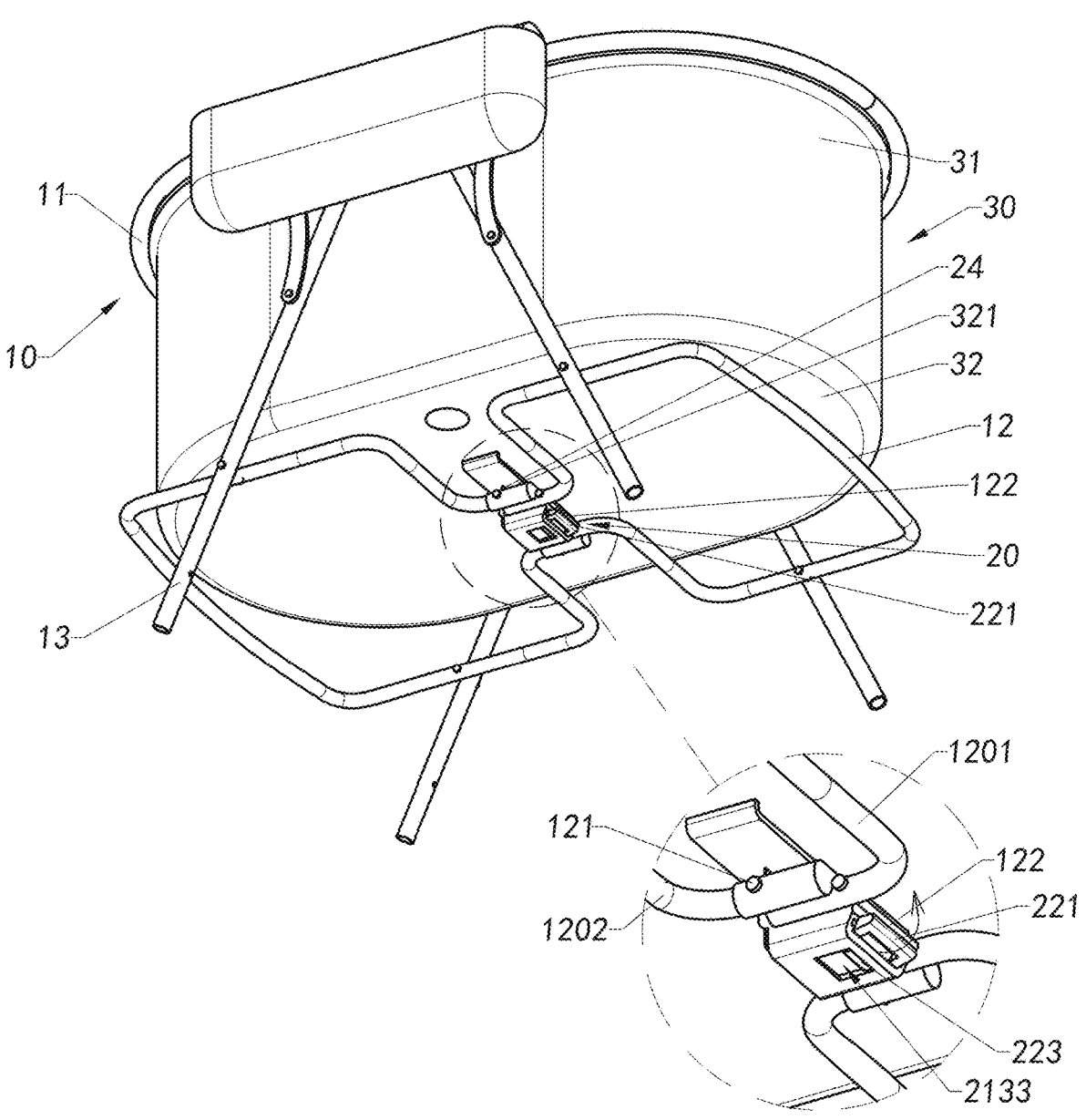

In addition, the relationship and movement of the foldable container during the unfolding process according to the preferred embodiment are shown in FIGS. 6A to 6C.

When the foldable container is actuated for being used, as an example, the top supporting arms 11 are opened from the folded mode. The top supporting arms 11 are configured to drive the supporting legs 13 to move and expand around the folding assembly 110. The supporting legs 13 are configured to drive the folding arms 12 to open about the pivot shafts 130. In other words, the folding arms 12 are driven to rotate about the pivot shafts 130 by the movements of the supporting legs 13. When the folding arms 12 are unfolded to lay flat on each other, the folding arms 12 are rotated about the rotating rod 121. The folding arm 12 will be supported by the operation switch 20 to restrict its further movement.

Specifically, when the free rotatable folding arm 1201 is rotated to the fixed folding arm 1202, the free rotatable folding arm 1201 is rotated to be supported by the slider 22 of the operation switch 20 and is parallel to the fixed folding arm 1202, such that the folding arms 12 are expand to lay flat on each other. The foldable support frame 10 is in the unfolded mode. When the free rotatable folding arm 1201 is driven to rotate, the switch rod 122 is lifted to apply the force to the supporting end 221 of the slider 22. Then the slider 22 is pushed to move back into the slider cavity 213. After the switch rod 122 is continuously raised to pass over the slider 22, the slider 22 is not affect by the force, such that the slider 22 is pushed out of the slider cavity 213 by the resilient member 23 to protrude out of the slider cavity 213. The switch rod 122 is supported on the slider 22 when the slider 22 is protruded out of the slider cavity 213. Under this circumstance, the switch rod 122 cannot push the slider 22 back by exerts its weight on the slider 22. Therefore, the folding arm 12 is unfolded and is stably supported by the switch 20. The foldable support frame 10 is moved at its unfolded mode. The container body 30 is opened up as the top supporting arms 11 are expanded.

Accordingly, as the top supporting arm 11 of the foldable support frame 10 is unfolded, the folding arm 12 is stably supported by the operation switch 20. Furthermore, under the movement of the top supporting arm 11, the container body 30 is actuated to be opened.

In addition, the relationship and movement of the foldable container during the folding process according to the preferred embodiment are shown in FIGS. 7A to 7C.

In order to fold the foldable container, the handle 321 is pulled to lift the container body 30, such that the pulling strap 24 will transmit a pulling force to pull the slider 22 to move back in the slider cavity 213. When the folding arm 12 is unfolded, the supporting end 221 will support the switch rod 122 on its planar surface to bear the weight of the switch rod 122 without being pushed back. When the slider 22 is moved backward in the slider cavity 213, the slider 22 will resist the elastic force of the resilient member 23. The switch rod 122 of the folding arm 12 will be dropped after losing the supportability so as to cause the free rotatable folding arm 1201 to rotate about the rotating rod 121. In other words, the free rotatable folding arm 1201 is dropped and folded with the fixed folding arm 1202.

When two arm portions of the folding arm 12 are folded with each other, the top supporting arms 11 and the supporting legs 13 are also folded accordingly. The rotation of the folding arm 12 will drive the supporting legs 13 to move about the pivot shafts 130. In other words, the supporting legs 13 are configured to rotate with the folding movements of the folding arms 12, such that the top supporting arm 11 is driven to rotate around the folding assembly 110 to be folded.

Accordingly, when the pulling strap 24 is pulled to operate the operation switch 20, the folding arm 12 will lose the support of the operation switch 20. Then, when folding arm 12 is folded due to gravity, the supporting legs 13, the top supporting arms 11 and the container body 30 are also folded along with the folding movements of the folding arms 12. Therefore, the foldable container is folded up by one single pulling action.

As shown in FIGS. 8 to 10B, a foldable container according to a second embodiment illustrates an alternative mode of the first embodiment, wherein the difference between the first and second embodiments is that the container body 30' is detachably coupled on the foldable supporting frame 10'. It is worth mentioning that the container body 30' can be any conventional container suitable for being carried by the foldable supporting frame 10'.

The foldable supporting frame 10' comprises at least two folding arms 12' and at least four supporting legs 13'. Preferably, the number of the folding arms 12' and the number of the supporting legs 13' are designed accordingly. Each of the folding arms 12' is correspondingly supported by the two supporting legs 13'.

Figure 9A:
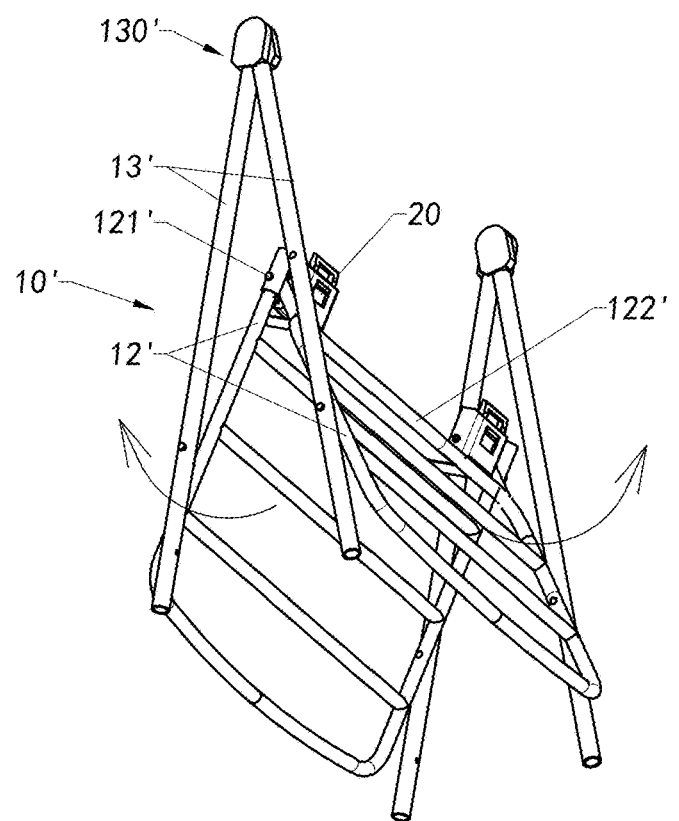
FIGS. 9A to 9B illustrate an unfolding operation of the foldable container according to the above second preferred embodiment of the present invention.
Figure 9B:
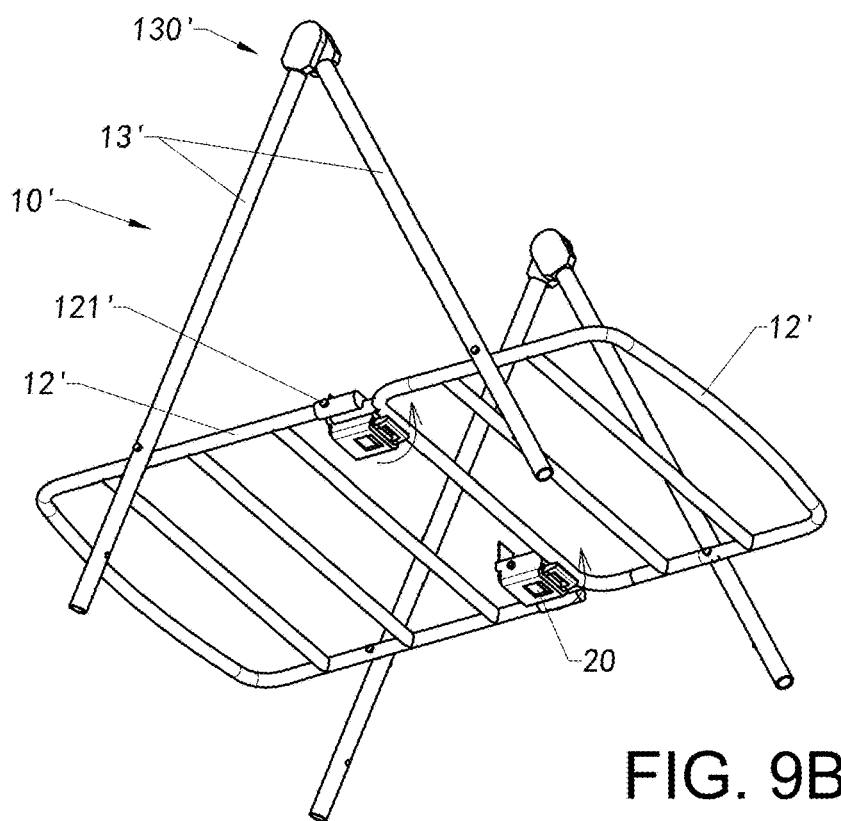

In addition, according to the embodiment, the supporting legs 13' are pivotally connected to each other about the pivot shaft 130' and are driven by the folding arms 12 to rotate about the pivot shaft 130'. As shown in FIGS. 9A and 9B, as the folding arms 12' rotate about the rotating rod 121' to be folded or unfolded, the angle and distance between the folding arms 12' will change. The supporting legs 13' are also driven to rotate about the pivot shaft 130'.

According to the second embodiment, two of the operation switches 20 are installed on one of the folding arms 12'. The operation switch 20 has the same structure and function as the above-mentioned first embodiment, and thus not be repeated here. However, the switch rod 122' is designed and shaped differently. The switch rod 122' is integrally formed on the folding arm 12' for providing supporting purpose.

In addition, FIGS. 9A to 9B illustrate the relationship and movement of unfolding the foldable container according to the preferred embodiment.

The foldable supporting frame 10' is opened from the folded mode. The supporting legs 13' are driven by the folding arms 12' and are expanded about the pivot shafts 130'. The supporting legs 13' can drive the folding arms 12' to be opened. When the folding arms 12' are unfolded to lay flat with each other, the folding arms 12' are rotated about the rotating rod 121'. The folding arm 12' will be supported by the operation switch 20 to restrict further downward movement, and further upward movement is restricted by the supporting leg 13' and the pivot shaft 130'.

Specifically, when one of the folding arms 12' is rotated toward another folding arm 12, the switch rod 122' is lifted to the supporting end 211 of the slider 22. Each of the sliders 22 is configured to support the side of the switch rod 122', such that the switch rod 122' is symmetrically supported by the two operation switches 20. Then, each of the sliders 22 is pushed by the switch rod 122' to move into the slider cavity 213, such that the switch rod 122' will continue to lift and pass the slider 22. Each of the sliders 22 is pushed out of the slider cavity 213 by the resilient member 23 so as to protrude out of the slider cavity 213 again. The switch rod 122' is supported by the slider 22 and placed on the two operation switches 20 when the slider 22 is protruded out of the slider cavity 213. Under the circumstance, the switch rod 112' cannot push the slider 22 backward, and the weight of the switch rod 122' is supported on the slider 22. Then, the folding arm 12' is unfolded and is stably supported by the operation switch 20. The foldable supporting frame 10' is then moved at the unfolded mode. The container body 30' can be placed on the folding arms 12'.

Accordingly, as the folding arm 12' or the supporting leg 13' of the foldable supporting frame 10' is unfolded, the folding arm 12' is stably supported by the operation switch 20, such that the switch lever 122' can support the weight of the container body 30'.

Figure 10A:
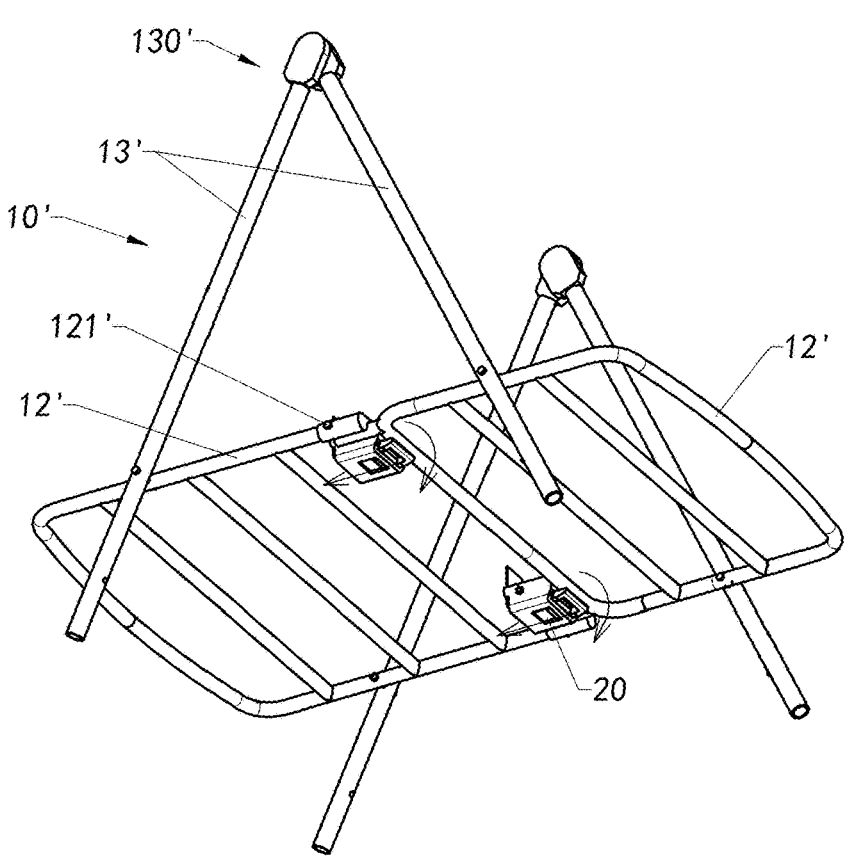
FIGS. 10A to 10B illustrate a folding operation of the foldable container according to the above second preferred embodiment of the present invention.
Figure 10B:
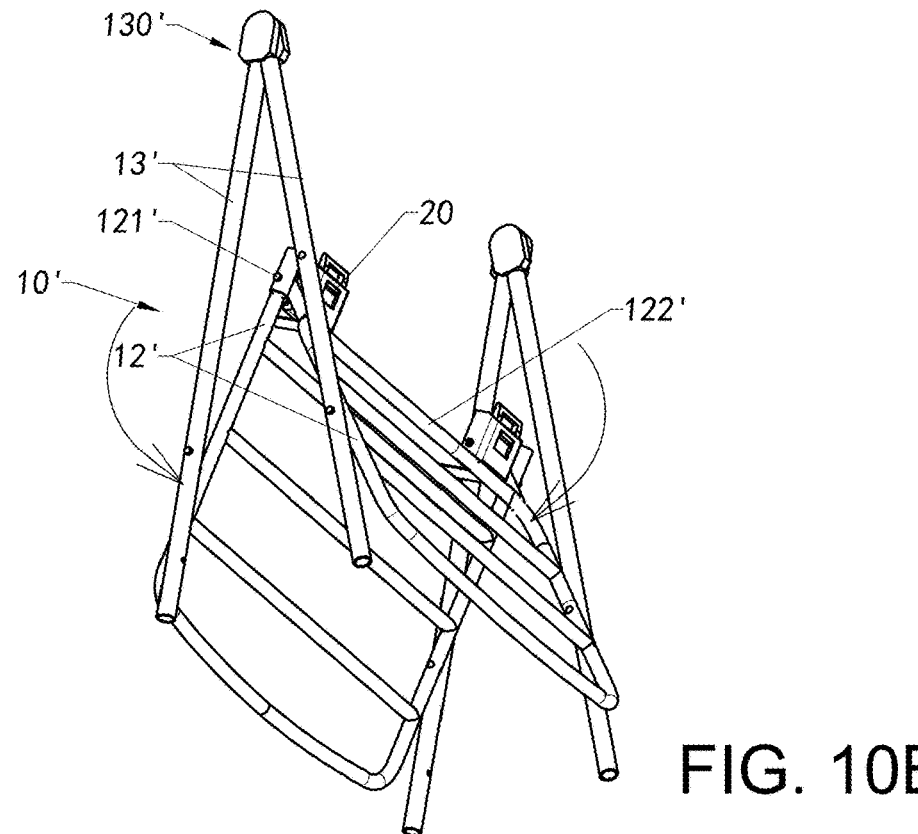

In addition, relationship and movement of the foldable container during the folding process according to the preferred embodiment are shown in FIGS. 10A to 10B.

When the folding arm 12' is unfolded, the switch rod 122' is supported on the planar surface of the supporting end 221 to support the weight of the switch rod 122' without being pushed back. In order to fold the foldable container, it is necessary to pull the two pulling straps 24', such that each slider 22 is moved backward in the slider cavity 213. Each of the sliders 22 is pulled back in the slider cavity 213 against the elastic force of the resilient member 23. The switch rod 122' of the folding arm 12' will lose the support, and then will fall and rotate about the rotating rod 121'. In other words, one of the folding arms 12' is dropped for being folded with another folding arm 12'. The rotation of the folding arm 12' will drive the supporting leg 13' to move about the pivot shaft 130'. In other words, as the folding arm 12' is folded, the supporting leg 13' is rotated correspondingly.

Normally, when the pulling strap 24 is pulled to actuate the operation switch 20, the folding arm 12' will lose the support provided by the operation switch 20. Then the folding arm 12' is folded by its own gravity, wherein the supporting leg 13' is folded as the folding arm 12' is folded. Therefore, the foldable container is folded by the single pulling action.

In an alternative mode of the present invention, two pulling straps 24 can be connected end-to-end. Then, by pulling only one of the pulling straps 24, the two operation switches 20 can be operated. In addition, the two ends of the pulling strap 24 are securely fastened to the two sliders 22 respectively. By pulling the pulling strap 24, the two operation switches 20 are operated at the same time.

Figure 11:
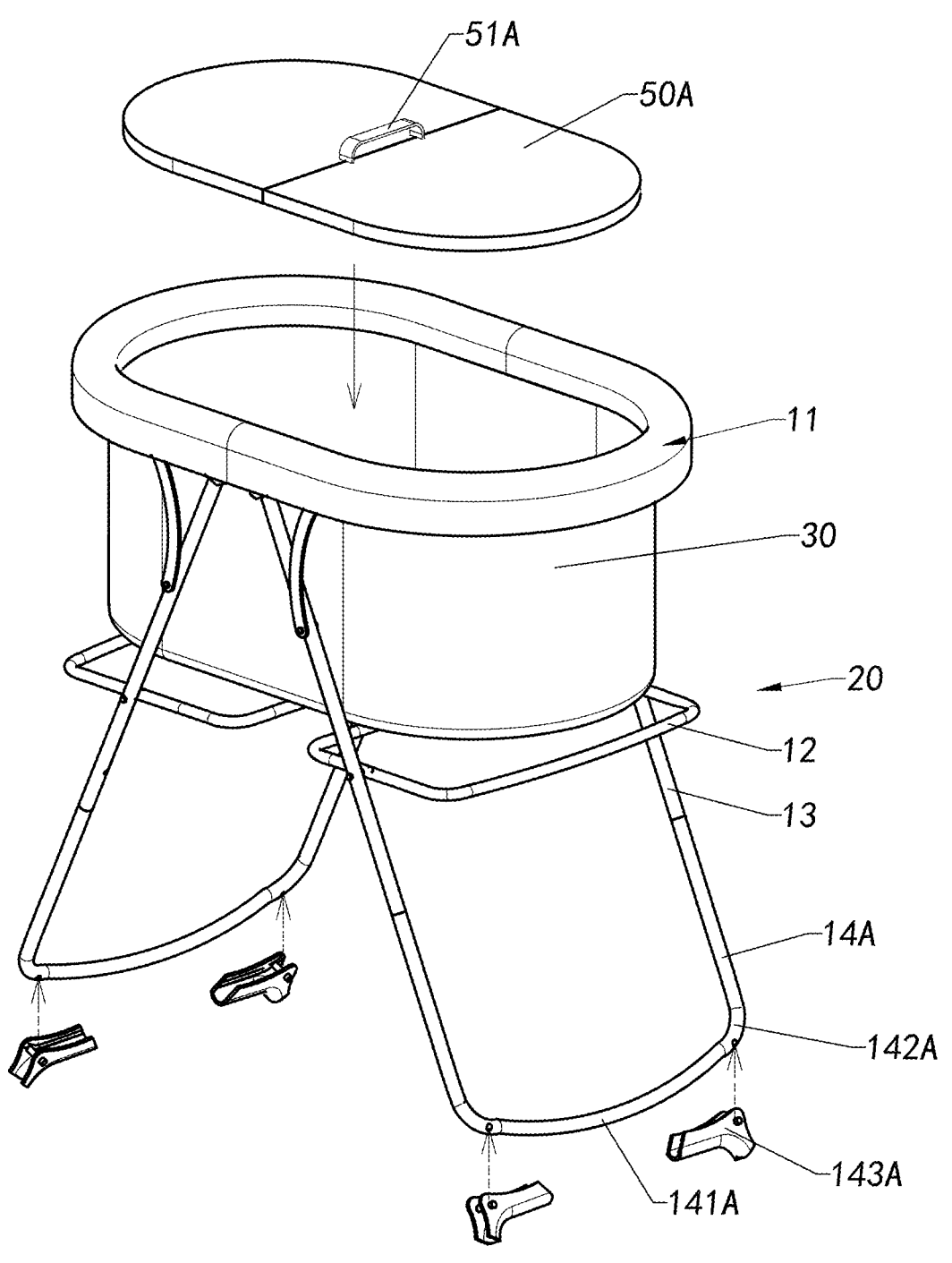
FIG. 11 is a perspective view of a foldable container at an unfolded mode according to a third preferred embodiment of the present invention.
Figure 12:
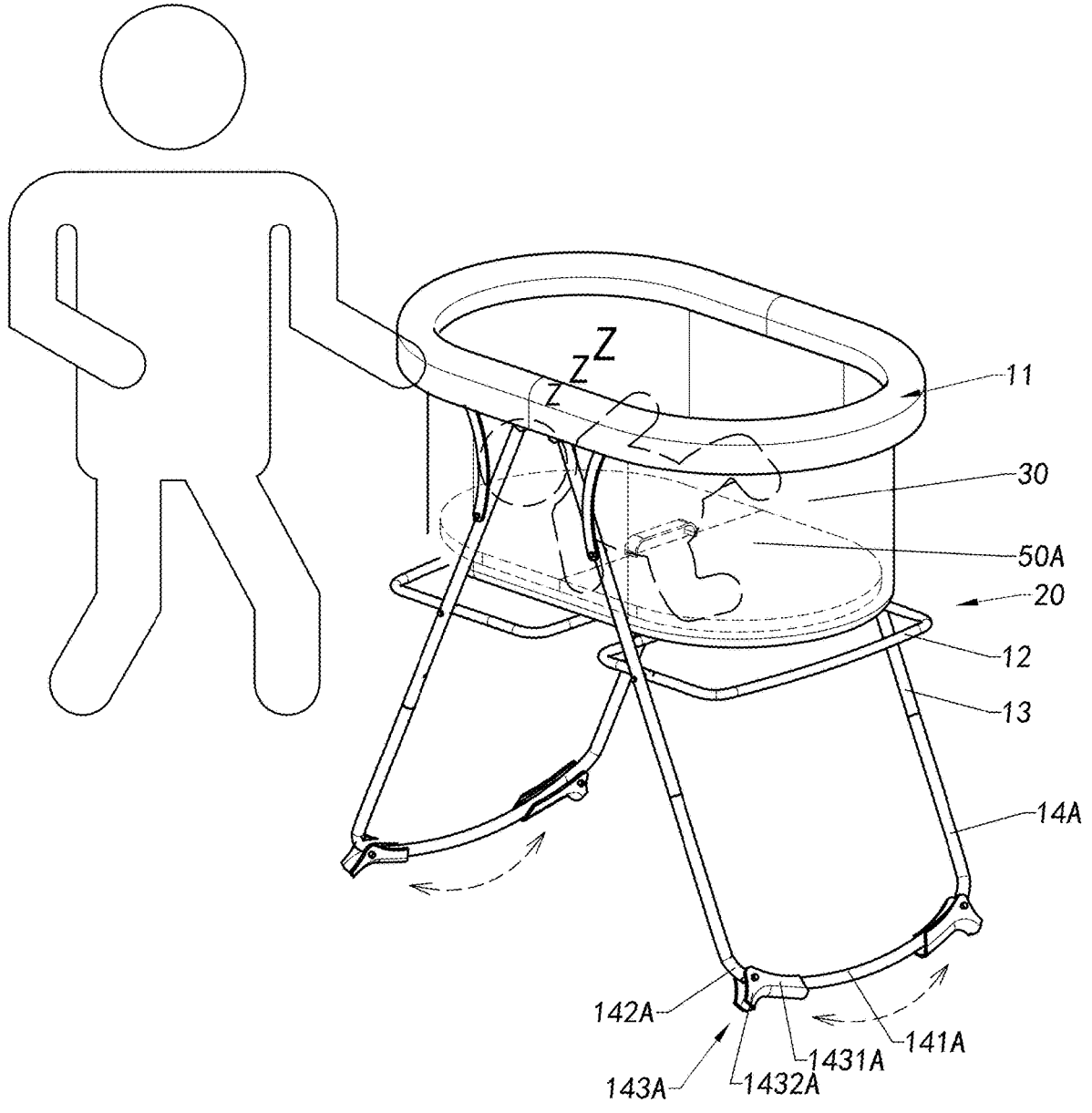
FIG. 12 illustrates an application of the foldable container at the unfolded mode according to the above third preferred embodiment of the present invention, illustrating the foldable container serving as a rocking container.
Figure 13:
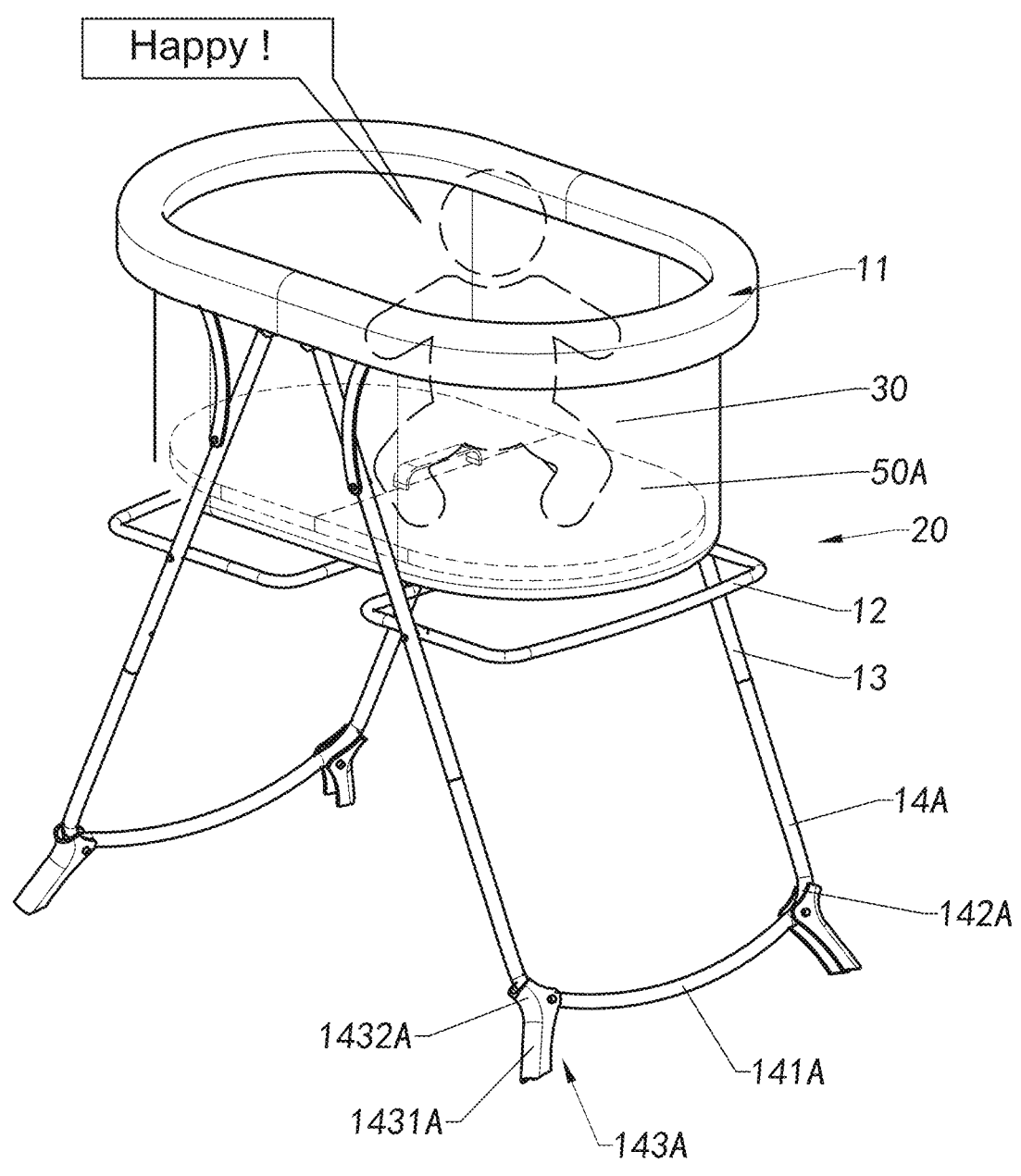
FIG. 13 illustrates an application of the foldable container at the unfolded mode according to the above third preferred embodiment of the present invention, illustrating the foldable container serving as a baby crib.

Moreover, as shown in FIGS. 11 to 13, a foldable container according to a third embodiment illustrates another alternative mode of the first embodiment, wherein the difference between the first and third embodiment is that the third embodiment further comprises a mattress 50A disposed in the container body 30, such that the container body 30 serves as a bed or a resting basket, the mattress 50A provides a rigid support to the child or pet in the container body 30.

In other words, at least two folding arms 12 and at least four supporting legs 13 are correspondingly configured, wherein each of the folding arms 12 is correspondingly supported by two supporting legs 13. Similarly, the supporting legs 13 are pivotally connected to each other about the pivot shaft 130, wherein the supporting leg 13 is driven by the folding arm 12 to rotate about the pivot shaft 130. As the folding arms 12 rotate about the rotating rod 121 to fold or unfold, the angle and distance between the folding arms 12 change. The supporting leg 13 is also driven to rotate about the pivot shaft 130. The operation switch 20 is coupled at one of the folding arms 12. The operation switch 20 has the same structure and function as the above mentioned first embodiment, and thus not being repeated here.

It is worth mentioning that the extension legs 14A of the foldable supporting frame 10 are implemented differently in the third embodiment. The extension leg 14A further comprises a rocking frame 141A, two corner frames 142A, and two foot stands 143A, wherein the rocking frame 141A is an elongated bar shape and is formed in a curved manner, wherein two ends of the rocking frame 141A is coupled to the two corner frames 142A respectively, wherein the foot stands 143A are pivotally coupled at the corner frames 142A respectively. The rocking frame 141A is arranged extended along a lower part of the supporting leg 13 in a convex manner for supporting on the ground. Each of the foot stands 143A comprises a supporting stand 1431A and a swinging stand 1432A integrally extended therefrom. For retaining the extension leg 14A at a stationary position, the supporting stands 1431A are rotatably extended toward a direction of the supporting leg 13 away from the rocking frame 141A and are rotatably folded away from each other to stand on the ground. For retaining the extension leg 14A at a rocking position, the supporting stands 1431A are rotatably folded to overlap with the rocking frame 141A, wherein the swinging stands 1432A are outwardly extended from the two corner frames 142A for limiting a rocking motion of the rocking frame 141A.

Furthermore, the supporting stand 1431A and the swinging stand 1432A are integrally formed in a one-piece member and are rotatably coupled at the corner frames 142A respectively. As shown in FIG. 12, when the swinging stand 1432A is rotated to extend to the direction of the supporting leg 13, the rocking frame 141A is supported on the ground. Via the curvature of the rocking frame 141A, the extension legs 14 can be rocked at a sideward rocking motion. Therefore, when the mattress 50A is placed in the container body 30, the container body 30 serves as a baby crib or baby cradle for a baby resting therein.

As shown in FIG. 13, when the supporting stands 1431A are rotatably extended to the direction of the supporting leg 13, the supporting stands 1431A are supported on the ground, such that the rocking frame 141A is raised above the ground. Then, the extension leg 14A is stably supported on the ground with four ground points. Therefore, when the mattress 50A is placed on the container body 30A, the container body 30A serves as a infant bed for a baby, and the foldable supporting frame 10 serves as a rocking bed for the baby.

It is worth mentioning that the operation of the extension legs 14A will not affect the unfolding and folding operations of the foldable supporting frame 10. The mattress 50A further comprises with a mattress handle 51A, wherein the mattress handle 51A is connected to the operation switch 20 to be pulled up for actuating the folding operation of the operation switch 20.

According to the preferred embodiment, the present invention further provides a folding method for the foldable container, which comprises the steps of:

folding the container body 30 via a pulling force; and when folding up the container body 30, folding the foldable supporting frame 10 from the unfolded mode to the folded mode, wherein at the unfolded mode, the container body 30 is supported by the foldable supporting frame 10, and at the folded mode, the foldable supporting frame and the container body 30 are folded together.

Specifically, the container body 30 is connected with the operation switch 20, wherein the operation switch 20 is actuated to fold the foldable supporting frame 10. In other words, the operation of the container body 30 is configured to drive the operation of the operation switch 20, thereby realizing the folding operation of the foldable supporting frame from the container body 30. Since the container body 30 is folded by the pulling action to fold up the foldable supporting frame 10 at the same time, the entire folding operation of the foldable container is automatically actuated and completed by one pulling action.

Figure 14:
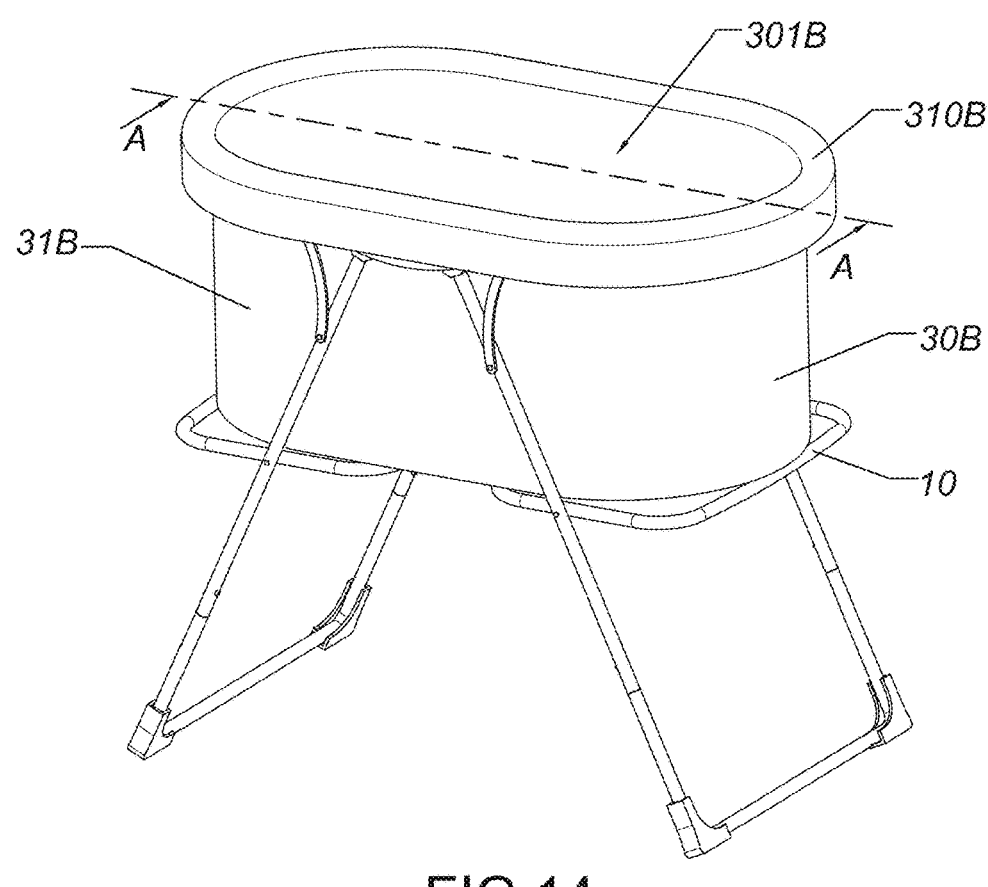
FIG. 14 is a perspective view of a foldable container according to a fourth preferred embodiment of the present invention.
Figure 15A:
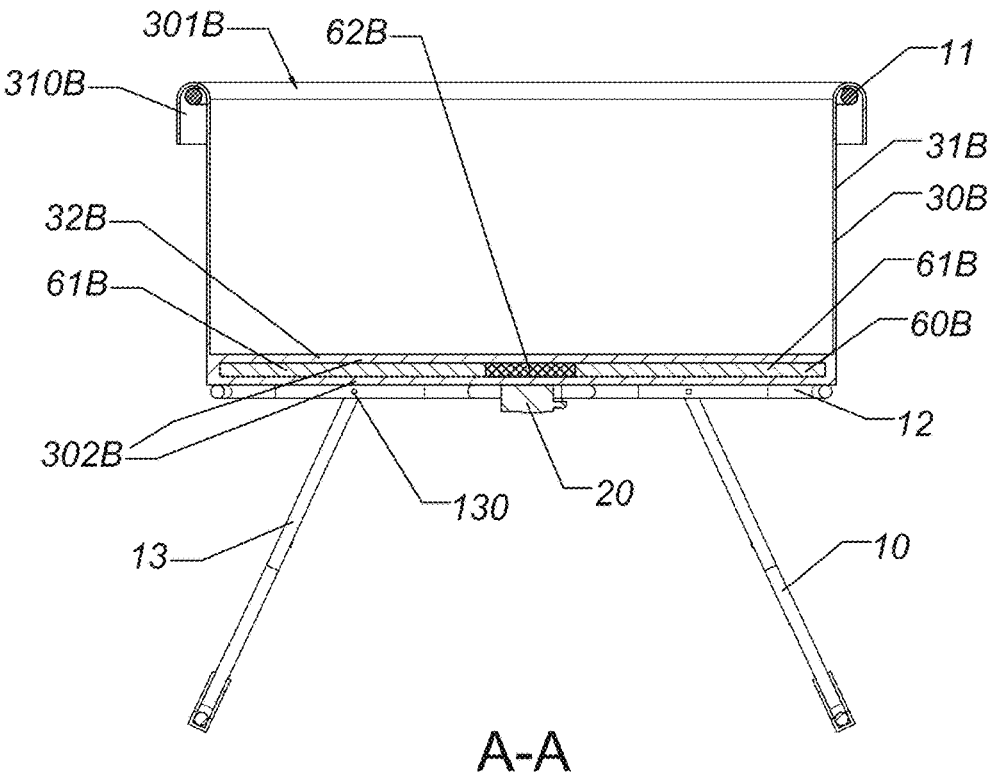
FIG. 15A is a sectional view along line A-A of FIG. 14.
Figure 15B:
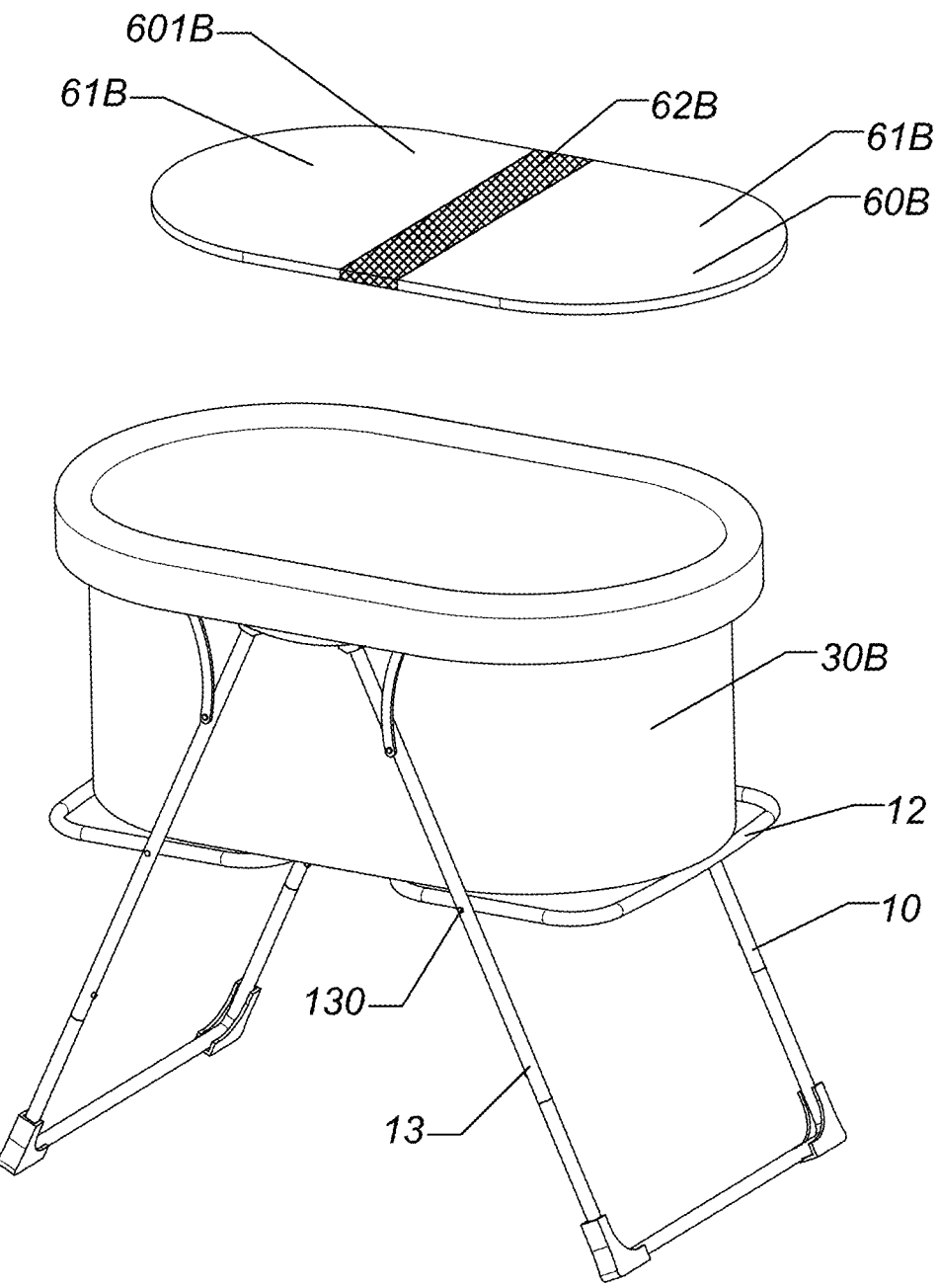
FIG. 15B is an exploded view of a foldable container according to the above fourth preferred embodiment of the present invention.

As shown in FIGS. 14 to 15B, a foldable container according to a fourth preferred embodiment illustrates another alternative mode of the first embodiment, wherein the difference between the fourth embodiment and the first embodiment is that the foldable container of the fourth embodiment further comprises a supporting pad 60B disposed in the container body 30B, wherein the supporting pad 60B has a flat supporting surface 601B for supporting the child or pet in the container body 30B when the foldable container is in the unfolded mode.

According to this preferred embodiment, when the foldable supporting frame 10 is unfolded, the container body 30B and the supporting pad 60B are automatically unfolded along with the folding operation of the foldable supporting frame 10. In other words, during the folding process of the foldable supporting frame 10, the container body 30B and the supporting pad 60B are automatically folded when the foldable supporting frame 10 is folded.

The foldable supporting frame 10 is a rigid frame that is made of a material selected from the group consisting of wood, metal, metal alloy, and plastic. The container body 30B is preferably a flexible body that is made of a flexible water-proof material such as PE (Polyethylene), PVC (Poly-vinyl Chloride), PP (Polypropylene) and TPU (Thermoplas-tic Urethane). The container body 30B comprises a sur-rounding wall 31B, a bottom wall 32B sealingly connected to the surrounding wall 31B to form the container body 30B, and a surrounding edge 310B defining an opening 301B thereof surrounded by the edge 310B.

The container body 30B is made of the flexible water-proof material, and thus the flexible container body 30B is constructed to be easy to be folded up with a folding of the foldable supporting frame 10 and unfolded with an unfold-ing of the foldable supporting frame 10, when the foldable supporting frame 10 is unfolded, the foldable supporting frame 10 is supported in the unfolded mode by the operation switch 20 to provide a rigid support to the container body 30B, and the operation switch 20 is able to be operated to release the rigid support of the foldable supporting frame 10 when the foldable supporting frame 10 is operated from the unfolded mode to the folded mode.

The foldable supporting frame 10 comprises two con-tainer arms 11, at least two folding arms 12 and at least four supporting legs 13 that are correspondingly configured, wherein each of the folding arms 12 is correspondingly supported by two supporting legs 13. Similarly, the support-ing legs 13 are pivotally connected to each other about the pivot shaft 130, wherein the supporting leg 13 is driven by the folding arm 12 to rotate about the pivot shaft 130. As the folding arms 12 rotate about the rotating rod 121 to fold or unfold, the angle and distance between the folding arms 12 change. The supporting leg 13 is also driven to rotate about the pivot shaft 130. The operation switch 20 is coupled at one of the folding arms 12. The operation switch 20 has the same structure and function as the above mentioned first embodiment, and thus not being repeated here.

According to this preferred embodiment, the supporting pad 60B is introduced so as to provide a rigid and stable support to the child or pet in the flexible container body 30B for bathing, cleaning or playing. In other words, with the support of the supporting pad 60B, the child or pet is able to stably stand or sit in the container body 30B above the supporting pad 60B.

As shown in FIG. 14, the supporting pad 60B comprises two pad bodies 61B and a flexible connecting element 62B connected between the two pad bodies 61B. Each of the two pad bodies 61 is made of a material that is relatively rigid, so as to provide a relatively rigid support to the child or pet when the foldable container is in the unfolded mode for child or pet bathing. When the foldable container is in the folded mode, the container body 30B is folded along with the folding of the foldable supporting frame 10, and the two pad bodies 61B are folded along with the folding of the container body 30B and are overlapped with each other. Each of the two pad bodies 61B may comprise a material selected from the group consisting of wood, metal, metal alloy, plastic. Each of the two pad bodies 61B also can be a latex mattress, cotton mattress, a sponge cushion mattress, or an air cushion mattress.

As shown in FIGS. 14 and 15B, the container body 30B comprises two wall layers 302B, the supporting pad 60B can be embedded between the two wall layers 302B of the bottom wall 32B, so that the supporting pad 60B is able to provide a rigid support at a bottom of the container body 30B and is foldable along with the folding of the container body 30B.

Figure 16:
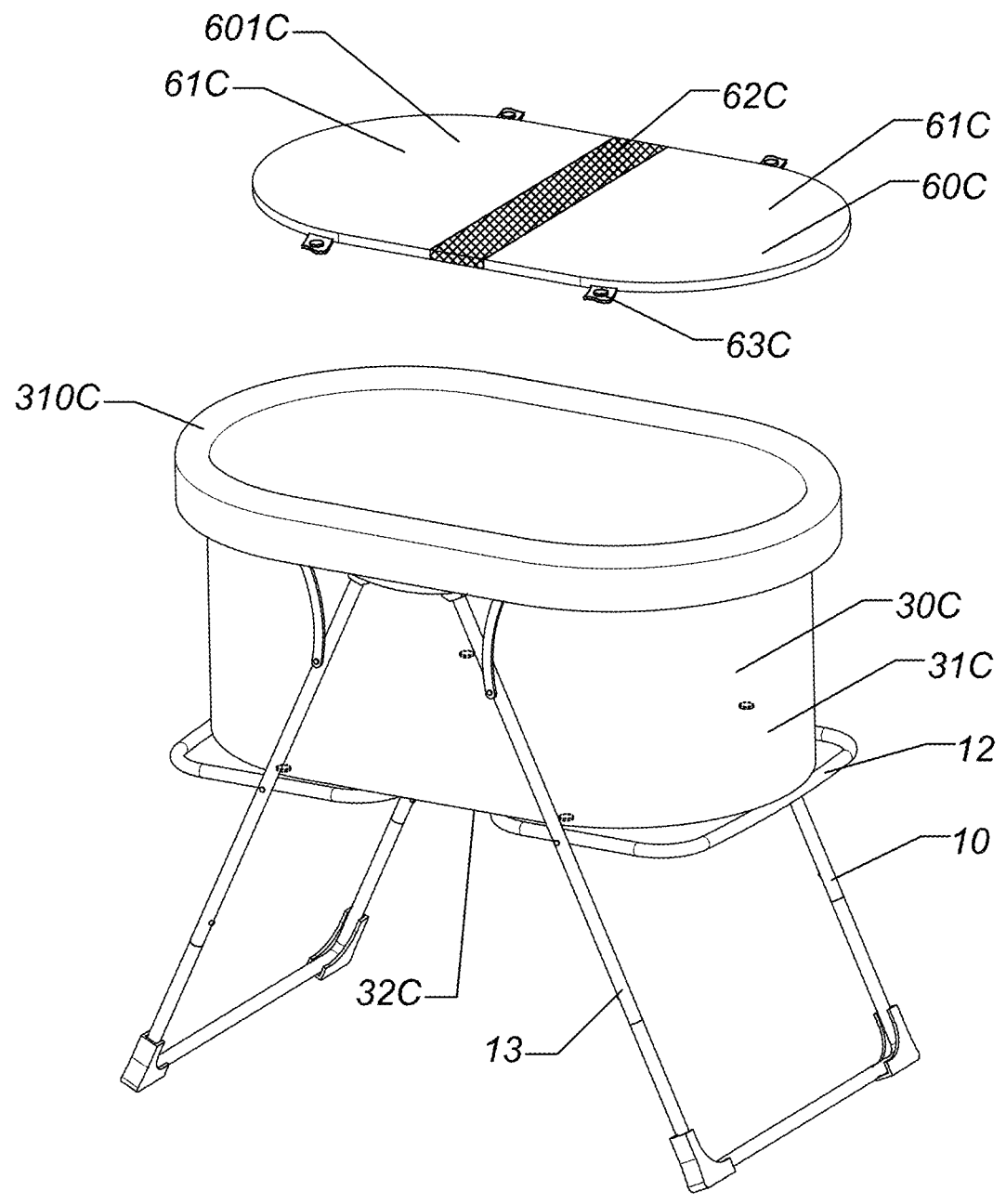
FIG. 16 is an exploded view of a foldable container at an unfolded mode according to a fifth preferred embodiment of the present invention.

As shown in FIG. 16 of the drawings, a foldable container according to a fifth preferred embodiment of the present invention is illustrated, the supporting pad 60C in this preferred embodiment can be disposed in the container body 30C above the bottom wall 32C for supporting the child or pet. The supporting pad 60C has a flat supporting surface 601C for supporting the child or pet in the container body 30C when the foldable container is in the unfolded mode.

The supporting pad 60C can be embodied as an integral piece of pad body that can be disposed in the contain body 30C when the container body 30C is in the unfolded mode, and can be taken out of the container body 30C before the container body 30C is moved from the unfolded mode to the folded mode. Alternatively, the bottom wall 32C of the container body is integrally formed as the flat supporting surface 601C of the supporting pad 60C. In other words, the supporting pad 60C provides the bottom wall 32C of the container body 30C.

According to this preferred embodiment, the supporting pad 60C can be detachably coupled to the container body 30C, and the supporting pad 60C comprises two pad bodies 61C, a flexible connecting element 62C connected between the two pad bodies 61C and two connector means 63C connecting the two pad bodies 61C to the surrounding wall 31C or bottom wall 32C of the container body 30C, so that the two pad bodies 61C are able to provide a rigid support to the child or pet when the foldable container is in the unfolded mode and are able to be folded along with the folding of the container body 30C and overlapped with each other when the foldable container is in the folded mode. Each of the connector means 63C may comprise a pair of connector members and may be zipper connecting means, button up connecting means, hook connecting means, adher-ing and attaching means, and so on.

Figures 17, 18A:
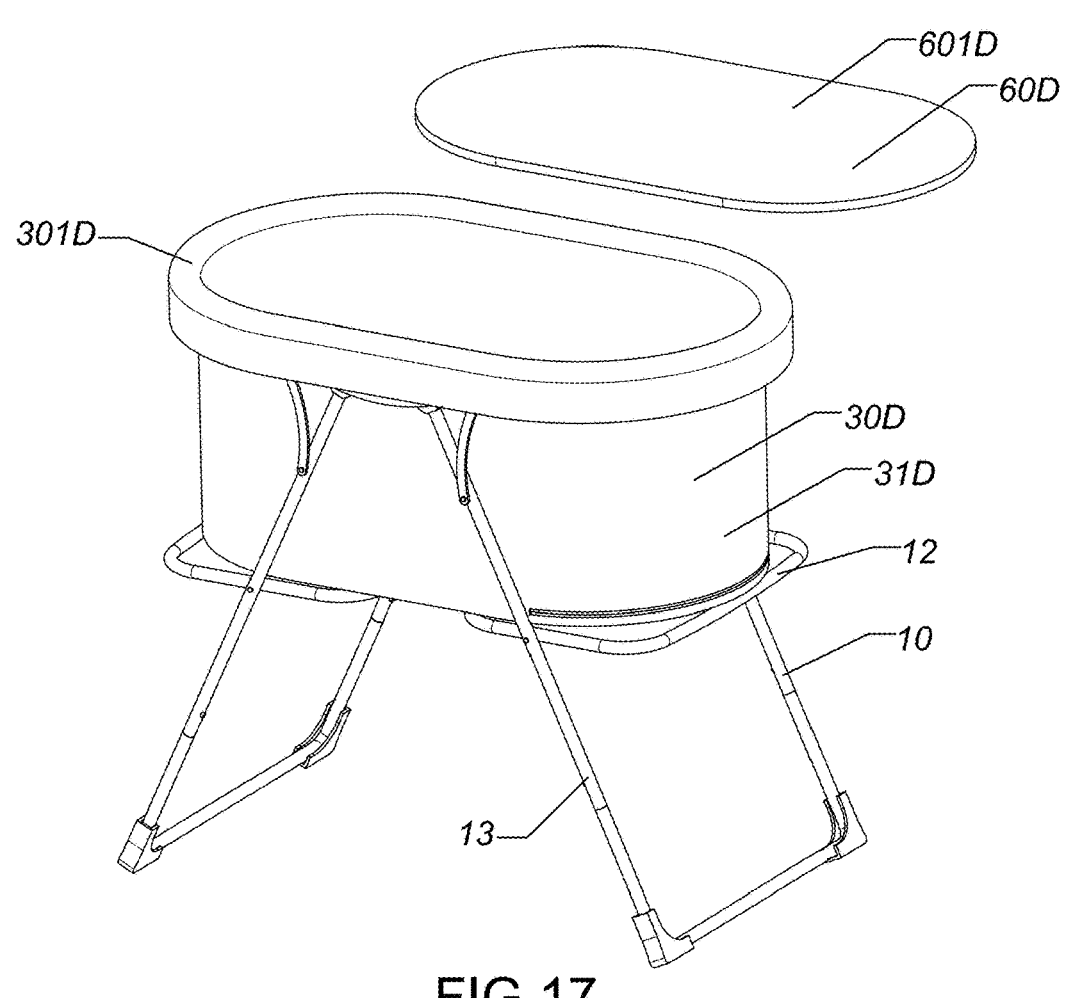
FIG. 17 is an exploded view of a foldable container at an unfolded mode according to a sixth preferred embodiment of the present invention.
FIG. 18A is a sectional view illustrating the support pad in a pocket of the container body according to the above sixth preferred embodiment of the present invention.

As shown in FIGS. 17 and 18A, a foldable container according to a sixth preferred embodiment of the present invention is illustrated, the supporting pad 60D in this preferred embodiment can be disposed in the container body 30D under the bottom wall 32D for supporting the child or pet. Accordingly, the container body 30D comprises a receiving pocket 34D that is arranged for receiving and holding the supporting pad 60D. The supporting pad 60D can be disposed into the receiving pocket 34D when the foldable container is in use and can be taken out before the foldable container is folded. The supporting pad 60D has a flat supporting surface 601D for supporting the child or pet in the container body 30D when the foldable container is in the unfolded mode.

Figure 18B:
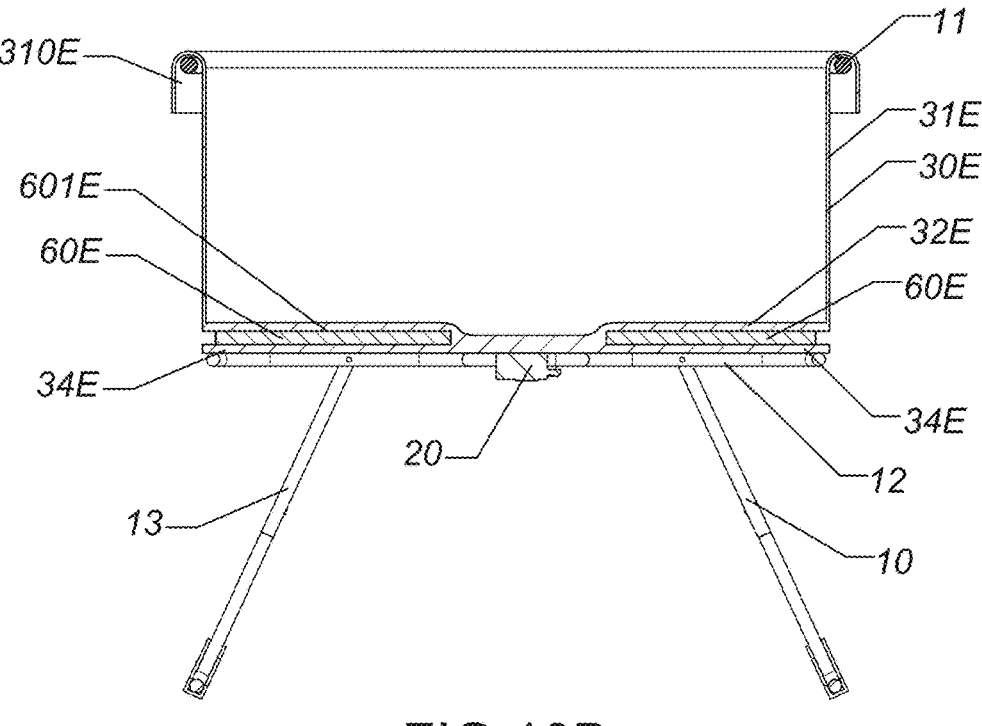
FIG. 18B is a sectional view illustrating the pad bodes of the supporting pad in two receiving pockets of the container body according to an alternative mode of the above sixth preferred embodiment of the present invention.

As shown in FIG. 18B, a foldable container according to an alternative mode of the above sixth preferred embodi-ment of the present invention is illustrated, the supporting pad 60E in this preferred embodiment can be disposed in the container body 30E under the bottom wall 32E for support-ing the child or pet. Accordingly, the container body 30E comprises two receiving pockets 34E that are respectively arranged for receiving and holding two pad bodies 61E of the supporting pad 60E. The two pad bodies 61E of the supporting pad 60E can be disposed into the receiving pockets 34E when the foldable container is in use and can be taken out before the foldable container is folded. The supporting pad 60E has a flat supporting surface 601E for supporting the child or pet in the container body 30E when the foldable container is in the unfolded mode.

Figure 19:
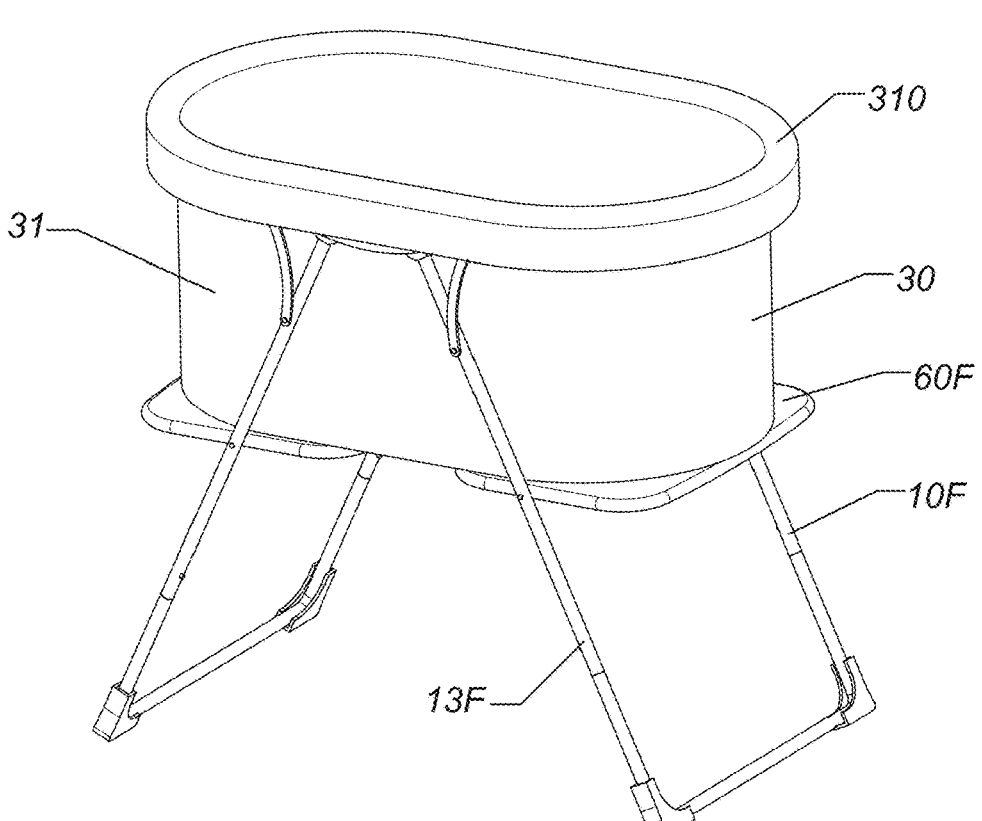
FIG. 19 is a perspective view of a foldable container at an unfolded mode according to a seventh preferred embodiment of the present invention.
Figure 20:
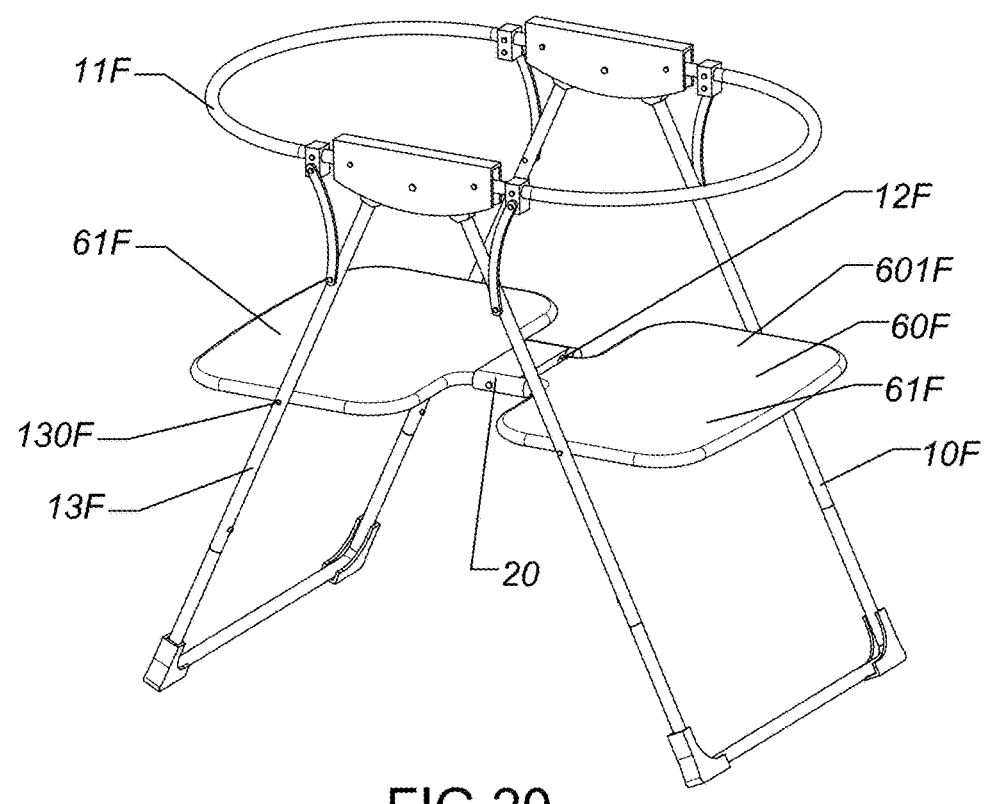
FIG. 20 is a perspective view of the foldable supporting frame of the foldable container at the unfolded mode according to the above seventh preferred embodiment of the present invention.
Figure 21:
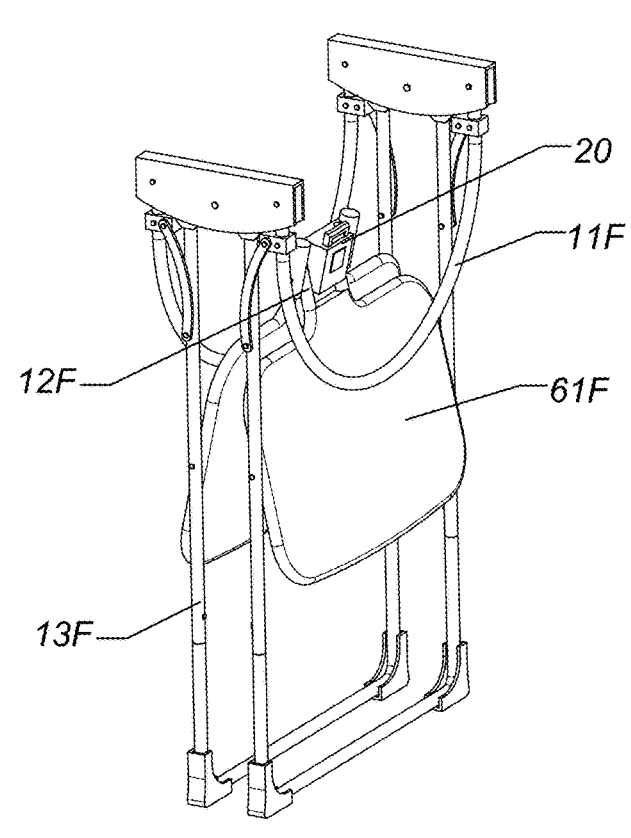
FIG. 21 is a perspective view of the foldable supporting frame of the foldable container at a folded mode according to the above seventh preferred embodiment of the present invention.

Referring to FIGS. 19 to 21, a foldable container according to a seventh preferred embodiment of the present invention is illustrated, wherein the difference between the seventh embodiment and the first embodiment is that the foldable container of the seventh embodiment further comprises a supporting pad 60F disposed on the foldable supporting frame 10F under the container body 30, wherein the supporting pad 60F has a flat supporting surface 601F for supporting the child or pet in the container body 30F when the foldable container is in the unfolded mode.

The supporting pad 60F can be an add-on structure that can be disposed on foldable supporting frame 10F when the foldable container is in the unfolded mode for child or pet bathing.

In this preferred embodiment, the foldable supporting frame 10F comprises two container arms 11F, at least two folding arms 12F and at least four supporting legs 13F are correspondingly configured, wherein each of the folding arms 12F is correspondingly supported by two supporting legs 13F. Similarly, the supporting legs 13 are pivotally connected to each other about the pivot shaft 130F, wherein the supporting leg 13F is driven by the folding arm 12F to rotate about the pivot shaft 130F. The operation switch 20F is coupled at one of the folding arms 12F. The operation switch 20F has the same structure and function as the above mentioned first embodiment, and thus not being repeated here.

The supporting pad 60B comprises two pad bodies 61F that are connected to said two folding arms 12F, so as to provide a rigid and stable support to the child or pet in the flexible container body 30 for bathing, cleaning or playing when the foldable container is in the unfolded mode. The two pad bodies 61F also can be folded and overlapped with each other when the folding arms 12F are folded to drive the two pad bodies 61F to rotate toward each other.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A foldable container for pet bathing, comprising:
a foldable supporting frame;
a container body arranged on said foldable supporting frame, wherein said container body is waterproof and comprises a surrounding wall, and a bottom wall connected to said surrounding wall, wherein said bottom wall has a drain port for draining water in the container body; and
two pad bodies disposed in said bottom wall of said container body, wherein said bottom wall of said container body comprises two wall layers and at least one receiving pocket between said two wall layers which are waterproof, such that said at least one receiving pocket is formed within said bottom wall which is connected to said surrounding wall, wherein said two pad bodies are received and hidden in said at least one receiving pocket within said bottom wall, so as to retain said two pad bodies at a bottom of said container body, wherein said container body is folded up with a folding of said foldable supporting frame and unfolded with an unfolding of said foldable supporting frame, wherein said two pad bodies are folded with a folding of said container body.

2. The foldable container, as recited in claim 1, wherein at least one of said two wall layers is connected to said surrounding wall.

3. The foldable container, as recited in claim 1, wherein two said receiving pockets are individually formed between said two wall layers to receive said two pad bodies respectively.

4. The foldable container, as recited in claim 3, wherein said bottom wall serves as a flexible connecting element connected between said two pad bodies to retain said pad bodies at a bottom of said container body.

5. The foldable container, as recited in claim 1, further comprising a flexible connecting element connected between said two pad bodies, wherein said flexible connecting element is received in said at least one receiving pocket when said pad bodies are received in said at least one receiving pocket.

6. The foldable container, as recited in claim 1, wherein each of said two pad bodies comprise a material selected from the group consisting of wood, metal, metal alloy, plastic, latex mattress, cotton mattress, sponge cushion mattress, and air cushion mattress.

7. The foldable container, as recited in claim 1, wherein said container body is made of a material selected from the group consisting of Polyethylene, Polyvinyl Chloride, Polypropylene and Thermoplastic Urethane.

8. The foldable container, as recited in claim 1, wherein a handle is connected to a middle area of said bottom wall of said container body, wherein said handle is configured for driving the folding of said foldable supporting frame and said container body by a pulling operation.

9. The foldable container, as recited in claim 8, wherein said foldable supporting frame comprises two top supporting arms, wherein said surrounding wall comprises an edge which is a top edge mounted to said two top supporting arms.

10. The foldable container, as recited in claim 1, wherein said foldable container further comprises a drain pipe connected to said drain port for allowing water to flow out said container body.

11. The foldable container, as recited in claim 1, wherein said foldable container further comprises a drain pipe connected to said drain port for allowing water to flow out said container body, wherein said two pad bodies disposed in said bottom wall of said container body are arranged at two opposite sides of said drain port.

* * * * *